(12) United States Patent
Wu et al.

(10) Patent No.: US 11,617,063 B2
(45) Date of Patent: Mar. 28, 2023

(54) METHOD, APPARATUS, AND SYSTEM FOR CHANGING ASSOCIATION RELATIONSHIP BETWEEN MCPTT USER AND MCPTT GROUP

(71) Applicant: Huawei Technologies Co., Ltd., Shenzhen (CN)

(72) Inventors: Yizhuang Wu, Beijing (CN); Cuili Ge, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 17/082,696

(22) Filed: Oct. 28, 2020

(65) Prior Publication Data

US 2021/0044939 A1 Feb. 11, 2021

Related U.S. Application Data

(63) Continuation of application No. 15/892,713, filed on Feb. 9, 2018, now Pat. No. 10,841,750, which is a (Continued)

(51) Int. Cl.
*H04W 4/08* (2009.01)
*H04W 72/04* (2009.01)
(Continued)

(52) U.S. Cl.
CPC .............. *H04W 4/08* (2013.01); *H04W 4/10* (2013.01); *H04W 4/90* (2018.02); *H04W 8/20* (2013.01);
(Continued)

(58) Field of Classification Search
CPC ........... H04W 4/08; H04W 4/90; H04W 4/10; H04W 76/45; H04W 8/20; H04W 72/04; H04W 76/50; H04L 67/306
See application file for complete search history.

(56) References Cited

U.S. PATENT DOCUMENTS

2005/0192041 A1 9/2005 Oxley et al.
2006/0058007 A1 3/2006 Choksi
(Continued)

FOREIGN PATENT DOCUMENTS

CN 1832592 A 9/2006
CN 101072390 A 11/2007
(Continued)

OTHER PUBLICATIONS

3GPP TS 23.179 V0.2.0 (Jul. 2015) (3GPP TS 23.179).*
(Continued)

*Primary Examiner* — Zhitong Chen
(74) *Attorney, Agent, or Firm* — Slater Matsil, LLP

(57) ABSTRACT

Embodiments of the present disclosure provide a method, an apparatus, and a system for changing an association relationship between an MCPTT user and an MCPTT group. A method for changing an association relationship between an MCPTT user and an MCPTT group is performed by a first network element device, including: receiving an association change request sent by first UE, where the association change request includes request information, the request information is used to indicate that a first MCPTT user requests to change an association relationship between a second MCPTT user and a first MCPTT group, and the first MCPTT user is an MCPTT user using the first UE; and setting the association relationship between the second MCPTT user and the first MCPTT group according to the association change request.

20 Claims, 15 Drawing Sheets

Related U.S. Application Data continuation of application No. PCT/CN2015/086516, filed on Aug. 10, 2015.

(51) Int. Cl.
*H04W 76/45* (2018.01)
*H04W 4/90* (2018.01)
*H04W 4/10* (2009.01)
*H04W 76/50* (2018.01)
*H04L 67/306* (2022.01)
*H04W 8/20* (2009.01)

(52) U.S. Cl.
CPC ......... *H04W 72/04* (2013.01); *H04W 76/45* (2018.02); *H04L 67/306* (2013.01); *H04W 76/50* (2018.02)

(56) References Cited

U.S. PATENT DOCUMENTS

| | | | | |
|---|---|---|---|---|
| 2016/0381528 A1* | 12/2016 | Lee | ........................ | H04W 4/10 455/404.1 |
| 2018/0132059 A1 | 5/2018 | Kim et al. | | |

FOREIGN PATENT DOCUMENTS

| | | |
|---|---|---|
| CN | 101137114 A | 3/2008 |
| CN | 101540957 A | 9/2009 |
| CN | 102137338 A | 7/2011 |
| CN | 104602351 A | 5/2015 |
| CN | 104618349 A | 5/2015 |
| EP | 2854471 A1 | 4/2015 |
| JP | 2007519344 A | 7/2007 |
| JP | 2008136088 A | 6/2008 |
| WO | 2015050395 A1 | 4/2015 |
| WO | 2015065022 A1 | 5/2015 |
| WO | 2015102445 A1 | 7/2015 |

OTHER PUBLICATIONS

"3rd Generation Partnership Project; Technical Specification Group Services and System Aspects; Mission Critical Push To Talk (MCPTT) over LTE; Stage 1 (Release 13)"; 3GPP TS 22.179 V13.2.0; Jun. 2015; 77 pages.

"3rd Generation Partnership Project; Technical Specification Group Services and System Aspects; Functional architecture and information flows to support mission critical communication services; Stage 2 (Release 13)"; 3GPP TS 23.179 V0.2.0; Jul. 2015; 97 pages.

Huawei et al.; "MCPTT Group affiliation"; 3GPP TSG-SA WG6 Meeting #3; S6-150286; San Jose del Cabo, Mexico; Apr. 13-17, 2015; 4 pages.

Huawei et al.; "Information Flows for Temporary groups formation-group regrouping within an MCPTT system"; 3GPP TSG-SA WG6 Meeting #5; S6-150737; Seoul, Korea; Jul. 6-10, 2015; 6 pages.

* cited by examiner

METHOD, APPARATUS, AND SYSTEM FOR CHANGING ASSOCIATION RELATIONSHIP BETWEEN MCPTT USER AND MCPTT GROUP

CROSS-REFERENCE TO RELATED APPLICATIONS

This application is a continuation of U.S. patent application Ser. No. 15/892,713, filed on Feb. 9, 2018, which is a continuation of International Application No. PCT/CN2015/086516, filed on Aug. 10, 2015. All of the afore-mentioned patent applications are hereby incorporated by reference in their entireties.

TECHNICAL FIELD

Embodiments of the present application relate to communications technologies, and in particular, to a method, an apparatus, and a system for changing an association relationship between an MCPTT user and an MCPTT group.

BACKGROUND

When a mission critical push to talk (MCPTT) user performs group communication in an MCPTT group, the MCPTT user first needs to establish an association relationship with the MCPTT group.

In the prior art, when an MCPTT user needs to establish an association relationship with an MCPTT group, user equipment (UE) (the MCPTT user is a user using the UE) sends a group association request message to an MCPTT server, to request to establish an association relationship with the MCPTT group. In an actual application, an MCPTT user may require one MCPTT user (or multiple MCPTT users) to join group communication in an MCPTT group, or may terminate group communication of one MCPTT user (or multiple MCPTT users) in an MCPTT group. For example, due to service requirements, some particular MCPTT users (for example, authorized advanced MCPTT users such as a dispatcher and an administrator) hope that an MCPTT user joins group communication in an MCPTT group. Therefore, an MCPTT user needs to be capable of changing an association relationship between another MCPTT user and an MCPTT group.

However, in the prior art, an MCPTT user cannot change an association relationship between another MCPTT user and a group.

SUMMARY

Embodiments of the present disclosure provide a method, an apparatus, and a system for changing an association relationship between an MCPTT user and an MCPTT group, so as to resolve a problem in the prior art that an MCPTT user cannot change an association relationship between another MCPTT user and a group.

According to a first aspect, an embodiment of the present disclosure provides a method for changing an association relationship between a mission critical push to talk MCPTT user and an MCPTT group, including: receiving, by a first network element device, an association change request sent by first user equipment UE, where the association change request includes request information, the request information is used to indicate that a first MCPTT user requests to change an association relationship between a second MCPTT user and a first MCPTT group, and the first MCPTT user is an MCPTT user using the first UE; and setting, by the first network element device, the association relationship between the second MCPTT user and the first MCPTT group according to the association change request.

With reference to the first aspect, in a first possible implementation manner of the first aspect, the first network element device is a group management server of the first MCPTT group, or the first network element device is a first MCPTT server, where the first MCPTT server is an MCPTT server in an MCPTT system that defines the first MCPTT group.

With reference to the first aspect or the first possible implementation manner of the first aspect, in a second possible implementation manner of the first aspect, the association change request further includes an association relationship indication, where the association relationship indication is used to indicate that the second MCPTT user is requested to be associated with or dissociated from the first MCPTT group.

With reference to any one of the first aspect or the first or the second possible implementation manner of the first aspect, in a third possible implementation manner of the first aspect, the request information includes: a user identifier of the second MCPTT user and a group identifier of the first MCPTT group; or a group identifier of a second MCPTT group to which the second MCPTT user belongs and a group identifier of the first MCPTT group.

With reference to any one of the first aspect or the first to the third possible implementation manners of the first aspect, in a fourth possible implementation manner of the first aspect, before the setting, by the first network element device, the association relationship between the second MCPTT user and the first MCPTT group according to the association change request, the method further includes: determining, by the first network element device, that the first MCPTT user is authorized to change an association relationship of the second MCPTT user.

With reference to any one of the first aspect or the first to the fourth possible implementation manners of the first aspect, in a fifth possible implementation manner of the first aspect, before the setting, by the first network element device, the association relationship between the second MCPTT user and the first MCPTT group according to the association change request, the method further includes: determining, by the first network element device according to a threshold of a quantity of MCPTT groups associated with the second MCPTT user, to change the association relationship between the second MCPTT user and the first MCPTT group.

With reference to any one of the first aspect or the first to the fifth possible implementation manners of the first aspect, in a sixth possible implementation manner of the first aspect, the setting, by the first network element device, the association relationship between the second MCPTT user and the first MCPTT group according to the association change request includes: setting, by the first network element device, the association relationship between the second MCPTT user and the first MCPTT group as a target association relationship according to the association change request, where the target association relationship is determined by the first network element device according to the association change request.

With reference to the sixth possible implementation manner of the first aspect, in a seventh possible implementation manner of the first aspect, before the setting, by the first network element device, the association relationship between the second MCPTT user and the first MCPTT group as a target association relationship according to the association change request, the method further includes: determining, by the first network element device according to a group policy of the first MCPTT group, that the first MCPTT group authorizes setting of the association relationship between the second MCPTT user and the first MCPTT group as the target association relationship.

With reference to the sixth or the seventh possible implementation manner of the first aspect, in an eighth possible implementation manner of the first aspect, the receiving, by a first network element device, an association change request sent by first UE includes: receiving, by the first network element device, the association change request that is sent by the first UE by using a second network element device, where the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

With reference to the eighth possible implementation manner of the first aspect, in a ninth possible implementation manner of the first aspect, the setting, by the first network element device, the association relationship between the second MCPTT user and the first MCPTT group as a target association relationship according to the association change request includes: storing, by the first network element device, the target association relationship between the second MCPTT user and the first MCPTT group; and sending, by the first network element device, an association change response to the second network element device, so that the second network element device forwards the association change response to the first UE, and sends a change message to second UE, where the change message is used to indicate that the association relationship between the second MCPTT user and the first MCPTT group is the target association relationship; and the second MCPTT user is an MCPTT user using the second UE.

With reference to any one of the sixth to the eighth possible implementation manners of the first aspect, in a tenth possible implementation manner of the first aspect, before the setting, by the first network element device, the association relationship between the second MCPTT user and the first MCPTT group as a target association relationship according to the association change request, the method further includes: sending, by the first network element device, a change message to second UE, where the change message is used to request the second MCPTT user to set the association relationship between the second MCPTT user and the first MCPTT group as the target association relationship, and the second MCPTT user is an MCPTT user using the second UE; and receiving, by the first network element device, a change response sent by the second UE, where the change response is used to indicate that setting of the association relationship between the second MCPTT user and the first MCPTT group as the target association relationship is authorized.

With reference to the tenth possible implementation manner of the first aspect, in an eleventh possible implementation manner of the first aspect, the setting, by the first network element device, the association relationship between the second MCPTT user and the first MCPTT group as a target association relationship according to the association change request includes: storing, by the first network element device, the target association relationship between the second MCPTT user and the first MCPTT group.

With reference to any one of the sixth to the eighth possible implementation manners of the first aspect, in a twelfth possible implementation manner of the first aspect, the setting, by the first network element device, the association relationship between the second MCPTT user and the first MCPTT group as a target association relationship according to the association change request includes: sending, by the first network element device, a change message to second UE, where the change message is used to indicate that the association relationship between the second MCPTT user and the first MCPTT group is the target association relationship, and the second MCPTT user is an MCPTT user using the second UE; and storing, by the first network element device, the target association relationship between the second MCPTT user and the first MCPTT group.

With reference to any one of the tenth to the twelfth possible implementation manners of the first aspect, in a thirteenth possible implementation manner of the first aspect, the sending, by the first network element device, a change message to second UE includes: sending, by the first network element device, the change message to the second UE by using an MCPTT server in the MCPTT system that defines the user configuration file of the second MCPTT user.

With reference to any one of the tenth to the thirteenth possible implementation manners of the first aspect, in a fourteenth possible implementation manner of the first aspect, after the setting, by the first network element device, the association relationship between the second MCPTT user and the first MCPTT group as a target association relationship according to the association change request, the method further includes: sending, by the first network element device, an association change response to the first UE.

With reference to any one of the ninth to the fourteenth possible implementation manners of the first aspect, in a fifteenth possible implementation manner of the first aspect, the change message includes a user identifier of the first MCPTT user.

With reference to the fifteenth possible implementation manner of the first aspect, in a sixteenth possible implementation manner of the first aspect, the association change request further includes the user identifier of the first MCPTT user.

According to a second aspect, an embodiment of the present disclosure provides a method for changing an association relationship between a mission critical push to talk MCPTT user and an MCPTT group, including: receiving, by a second network element device, an association change request sent by first user equipment UE, where the association change request includes request information, the request information is used to indicate that a first MCPTT user requests to change an association relationship between a second MCPTT user and a first MCPTT group, and the first MCPTT user is an MCPTT user using the first UE; sending, by the second network element device, a change message to second UE, where the change message is used to request the second MCPTT user to set the association relationship between the second MCPTT user and the first MCPTT group as a target association relationship, and the second MCPTT user is an MCPTT user using the second UE; receiving, by the second network element device, a change response sent by the second UE, where the change response is used to indicate that setting of the association relationship between the second MCPTT user and the first MCPTT group as the target association relationship is authorized; and sending, by the second network element device, the association change request to a first network element device.

With reference to the second aspect, in a first possible implementation manner of the second aspect, the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

With reference to the second aspect or the first possible implementation manner of the second aspect, in a second possible implementation manner of the second aspect, the first network element device is a group management server of the first MCPTT group, or the first network element device is a first MCPTT server, where the first MCPTT server is an MCPTT server in an MCPTT system that defines the first MCPTT group.

According to a third aspect, an embodiment of the present disclosure provides a method for changing an association relationship between a mission critical push to talk MCPTT user and an MCPTT group, including: sending, by first user equipment UE, an association change request to a first network element device, where the association change request includes request information, the request information is used to indicate that a first MCPTT user requests to change an association relationship between a second MCPTT user and a first MCPTT group, so that the first network element device sets the association relationship between the second MCPTT user and the first MCPTT group according to the association change request, and the first MCPTT user is a user using the first UE; and receiving, by the first UE, an association change response sent by the first network element device.

With reference to the third aspect, in a first possible implementation manner of the third aspect, the first network element device is a group management server of the first MCPTT group, or the first network element device is an MCPTT server in an MCPTT system that defines the first MCPTT group.

With reference to the third aspect or the first possible implementation manner of the third aspect, in a second possible implementation manner of the third aspect, the association change request further includes an association relationship indication, where the association relationship indication is used to indicate that the second MCPTT user is requested to be associated with or dissociated from the first MCPTT group.

With reference to any one of the third aspect or the first or the second possible implementation manner of the third aspect, in a third possible implementation manner of the third aspect, the request information includes: a user identifier of the second MCPTT user and a group identifier of the first MCPTT group; or a group identifier of a second MCPTT group to which the second MCPTT user belongs and a group identifier of the first MCPTT group.

With reference to any one of the third aspect or the first to the third possible implementation manners of the third aspect, in a fourth possible implementation manner of the third aspect, the association change request further includes a user identifier of the first MCPTT user.

According to a fourth aspect, an embodiment of the present disclosure provides an apparatus for changing an association relationship between a mission critical push to talk MCPTT user and an MCPTT group, where the apparatus is a first network element device, and the apparatus includes: a receiving module, configured to receive an association change request sent by first user equipment UE, where the association change request includes request information, the request information is used to indicate that a first MCPTT user requests to change an association relationship between a second MCPTT user and a first MCPTT group, and the first MCPTT user is an MCPTT user using the first UE; and a setting module, configured to set the association relationship between the second MCPTT user and the first MCPTT group according to the association change request.

With reference to the fourth aspect, in a first possible implementation manner of the fourth aspect, the first network element device is a group management server of the first MCPTT group, or the first network element device is a first MCPTT server, where the first MCPTT server is an MCPTT server in an MCPTT system that defines the first MCPTT group.

With reference to the fourth aspect or the first possible implementation manner of the fourth aspect, in a second possible implementation manner of the fourth aspect, the association change request further includes an association relationship indication, where the association relationship indication is used to indicate that the second MCPTT user is requested to be associated with or dissociated from the first MCPTT group.

With reference to any one of the fourth aspect or the first or the second possible implementation manner of the fourth aspect, in a third possible implementation manner of the fourth aspect, the request information includes: a user identifier of the second MCPTT user and a group identifier of the first MCPTT group; or a group identifier of a second MCPTT group to which the second MCPTT user belongs and a group identifier of the first MCPTT group.

With reference to the fourth aspect or any one of the first to the third possible implementation manners of the fourth aspect, in a fourth possible implementation manner of the fourth aspect, the setting module is further configured to: determine that the first MCPTT user is authorized to change an association relationship of the second MCPTT user.

With reference to the fourth aspect or any one of the first to the fourth possible implementation manners of the fourth aspect, in a fifth possible implementation manner of the fourth aspect, the setting module is further configured to: determine, according to a threshold of a quantity of MCPTT groups associated with the second MCPTT user, to change the association relationship between the second MCPTT user and the first MCPTT group.

With reference to any one of the fourth aspect or the first to the fifth possible implementation manners of the fourth aspect, in a sixth possible implementation manner of the fourth aspect, the setting, by the setting module, the association relationship between the second MCPTT user and the first MCPTT group according to the association change request specifically includes: setting the association relationship between the second MCPTT user and the first MCPTT group as a target association relationship according to the association change request, where the target association relationship is determined by the setting module according to the association change request.

With reference to the sixth possible implementation manner of the fourth aspect, in a seventh possible implementation manner of the fourth aspect, the setting module is further configured to: determine, according to a group policy of the first MCPTT group, that the first MCPTT group authorizes setting of the association relationship between the second MCPTT user and the first MCPTT group as the target association relationship.

With reference to the sixth or the seventh possible implementation manner of the fourth aspect, in an eighth possible implementation manner of the fourth aspect, the receiving module is specifically configured to: receive the association change request that is sent by the first UE by using a second network element device, where the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

With reference to the eighth possible implementation manner of the fourth aspect, in a ninth possible implementation manner of the fourth aspect, the apparatus further includes a sending module; and the setting, by the setting module, the association relationship between the second MCPTT user and the first MCPTT group as a target association relationship according to the association change request specifically includes: storing the target association relationship between the second MCPTT user and the first MCPTT group; and sending an association change response to the second network element device by using the sending module, so that the second network element device forwards the association change response to the first UE, and sends a change message to second UE, where the change message is used to indicate that the association relationship between the second MCPTT user and the first MCPTT group is the target association relationship; and the second MCPTT user is an MCPTT user using the second UE.

With reference to any one of the sixth to the eighth possible implementation manners of the fourth aspect, in a tenth possible implementation manner of the fourth aspect, the apparatus further includes a sending module; and the setting module is further configured to: send a change message to second UE by using the sending module, where the change message is used to request the second MCPTT user to set the association relationship between the second MCPTT user and the first MCPTT group as the target association relationship, and the second MCPTT user is an MCPTT user using the second UE; and receive, by using the receiving module, a change response sent by the second UE, where the change response is used to indicate that setting of the association relationship between the second MCPTT user and the first MCPTT group as the target association relationship is authorized.

With reference to the tenth possible implementation manner of the fourth aspect, in an eleventh possible implementation manner of the fourth aspect, the setting, by the setting module, the association relationship between the second MCPTT user and the first MCPTT group as a target association relationship according to the association change request specifically includes: storing the target association relationship between the second MCPTT user and the first MCPTT group.

With reference to any one of the sixth to the eighth possible implementation manners of the fourth aspect, in a twelfth possible implementation manner of the fourth aspect, the apparatus further includes a sending module; and the setting, by the setting module, the association relationship between the second MCPTT user and the first MCPTT group as a target association relationship according to the association change request specifically includes: sending a change message to second UE by using the sending module, where the change message is used to indicate that the association relationship between the second MCPTT user and the first MCPTT group is the target association relationship, and the second MCPTT user is an MCPTT user using the second UE; and storing the target association relationship between the second MCPTT user and the first MCPTT group.

With reference to any one of the tenth to the twelfth possible implementation manners of the fourth aspect, in a thirteenth possible implementation manner of the fourth aspect, the sending, by the sending module, a change message to second UE specifically includes: sending the change message to the second UE by using an MCPTT server in the MCPTT system that defines the user configuration file of the second MCPTT user.

With reference to any one of the tenth to the thirteenth possible implementation manners of the fourth aspect, in a fourteenth possible implementation manner of the fourth aspect, the sending module is further configured to: send an association change response to the first UE.

With reference to any one of the ninth to the fourteenth possible implementation manners of the fourth aspect, in a fifteenth possible implementation manner of the fourth aspect, the change message includes a user identifier of the first MCPTT user.

With reference to the fifteenth possible implementation manner of the fourth aspect, in a sixteenth possible implementation manner of the fourth aspect, the association change request further includes the user identifier of the first MCPTT user.

According to a fifth aspect, an embodiment of the present disclosure provides an apparatus for changing an association relationship between a mission critical push to talk MCPTT user and an MCPTT group, where the apparatus is a second network element device, and the apparatus includes: a receiving module, configured to receive an association change request sent by first user equipment UE, where the association change request includes request information, the request information is used to indicate that a first MCPTT user requests to change an association relationship between a second MCPTT user and a first MCPTT group, and the first MCPTT user is an MCPTT user using the first UE; and a sending module, configured to send a change message to second UE, where the change message is used to request the second MCPTT user to set the association relationship between the second MCPTT user and the first MCPTT group as a target association relationship, and the second MCPTT user is an MCPTT user using the second UE, where the receiving module is further configured to receive a change response sent by the second UE, where the change response is used to indicate that setting of the association relationship between the second MCPTT user and the first MCPTT group as the target association relationship is authorized; and the sending module is further configured to send the association change request to a first network element device.

With reference to the fifth aspect, in a first possible implementation manner of the fifth aspect, the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

With reference to the fifth aspect or the first possible implementation manner of the fifth aspect, in a second possible implementation manner of the fifth aspect, the first network element device is a group management server of the first MCPTT group, or the first network element device is a first MCPTT server, where the first MCPTT server is an MCPTT server in an MCPTT system that defines the first MCPTT group.

According to a sixth aspect, an embodiment of the present disclosure provides an apparatus for changing an association relationship between a mission critical push to talk MCPTT user and an MCPTT group, where the apparatus is first user equipment UE, and the apparatus includes: a sending module, configured to send an association change request to a first network element device, where the association change request includes request information, the request information is used to indicate that a first MCPTT user requests to change an association relationship between a second MCPTT user and a first MCPTT group, so that the first network element device sets the association relationship between the second MCPTT user and the first MCPTT group according to the association change request, and the first MCPTT user is a user using the first UE; and a receiving module, configured to receive an association change response sent by the first network element device.

With reference to the sixth aspect, in a first possible implementation manner of the sixth aspect, the first network element device is a group management server of the first MCPTT group, or the first network element device is an MCPTT server in an MCPTT system that defines the first MCPTT group.

With reference to the sixth aspect or the first possible implementation manner of the sixth aspect, in a second possible implementation manner of the sixth aspect, the association change request further includes an association relationship indication, where the association relationship indication is used to indicate that the second MCPTT user is requested to be associated with or dissociated from the first MCPTT group.

With reference to any one of the sixth aspect or the first or the second possible implementation manner of the sixth aspect, in a third possible implementation manner of the sixth aspect, the request information includes: a user identifier of the second MCPTT user and a group identifier of the first MCPTT group; or a group identifier of a second MCPTT group to which the second MCPTT user belongs and a group identifier of the first MCPTT group.

With reference to any one of the sixth aspect or the first to the third possible implementation manners of the sixth aspect, in a fourth possible implementation manner of the sixth aspect, the association change request further includes a user identifier of the first MCPTT user.

According to a seventh aspect, an embodiment of the present disclosure provides a system for changing an association relationship between a mission critical push to talk MCPTT user and an MCPTT group, including the first network element device according to any one of the fourth aspect or the first to the sixteenth possible implementation manners of the fourth aspect and the first user equipment UE according to any one of the sixth aspect or the first to the fourth possible implementation manners of the sixth aspect.

With reference to the seventh aspect, in a first possible implementation manner of the seventh aspect, the system further includes the second network element device according to any one of the fifth aspect or the first or the second possible implementation manner of the fifth aspect.

According to the method, the apparatus, and the system for changing an association relationship between an MCPTT user and an MCPTT group provided in the embodiments of the present disclosure, a first network element device receives an association change request sent by first UE, where the association change request includes request information, the request information is used to indicate that a first MCPTT user requests to change an association relationship between a second MCPTT user and a first MCPTT group, and the first MCPTT user is a user using the first UE; and the first network element device sets the association relationship between the second MCPTT user and the first MCPTT group according to the association change request. Therefore, the first MCPTT user can change an association relationship between the first MCPTT user and the first MCPTT group, thereby implementing that an MCPTT user changes an association relationship between another MCPTT user and a group.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
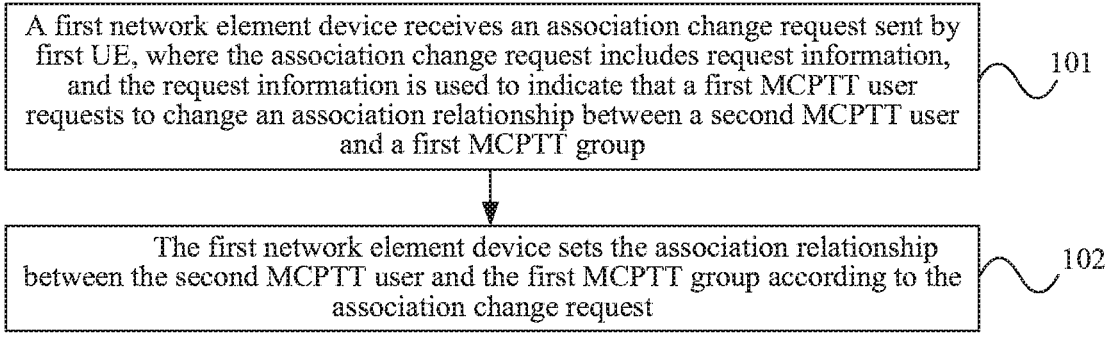
FIG. 1 is a flowchart of Embodiment 1 of a method for changing an association relationship between an MCPTT user and an MCPTT group according to the present disclosure.

FIG. 1 is a flowchart of Embodiment 1 of a method for changing an association relationship between an MCPTT user and an MCPTT group according to the present disclosure. As shown in FIG. 1, the method in this embodiment may include the following steps.

Step 101. A first network element device receives an association change request sent by first UE, where the association change request includes request information, and the request information is used to indicate that a first MCPTT user requests to change an association relationship between a second MCPTT user and a first MCPTT group.

The first MCPTT user is a user using the first UE.

Optionally, the first network element device is a group management server of the first MCPTT group, or the first network element device is a first MCPTT server. The first MCPTT server is an MCPTT server in an MCPTT system that defines the first MCPTT group.

It should be noted that the UE in the present disclosure may be any device that can be operated by a person, such as a mobile phone, a computer, a tablet computer, or a background controller.

Step 102. The first network element device sets the association relationship between the second MCPTT user and the first MCPTT group according to the association change request.

In this embodiment, a first network element device receives an association change request sent by first UE, where the association change request includes request information, the request information is used to indicate that a first MCPTT user requests to change an association relationship between a second MCPTT user and a first MCPTT group, and the first MCPTT user is a user using the first UE; and the first network element device sets the association relationship between the second MCPTT user and the first MCPTT group according to the association change request. Therefore, the first MCPTT user can change an association relationship between the first MCPTT user and the first MCPTT group, thereby implementing that an MCPTT user changes an association relationship between another MCPTT user and a group.

Figure 2:
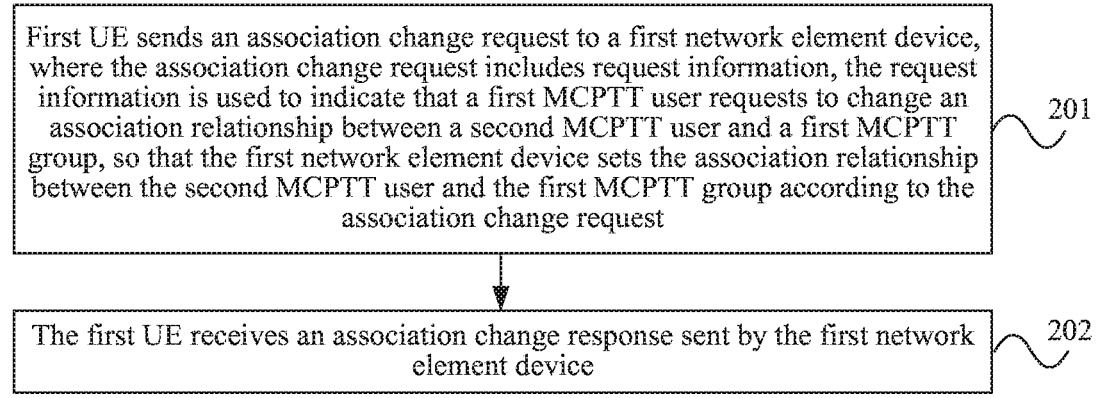
FIG. 2 is a flowchart of Embodiment 2 of a method for changing an association relationship between an MCPTT user and an MCPTT group according to the present disclosure.

FIG. 2 is a flowchart of Embodiment 2 of a method for changing an association relationship between an MCPTT user and an MCPTT group according to the present disclosure. As shown in FIG. 2, the method in this embodiment may include the following steps.

Step 201. First UE sends an association change request to a first network element device, where the association change request includes request information, the request information is used to indicate that a first MCPTT user requests to change an association relationship between a second MCPTT user and a first MCPTT group, so that the first network element device sets the association relationship between the second MCPTT user and the first MCPTT group according to the association change request.

The first MCPTT user is a user using the first UE.

Optionally, the first network element device is a group management server of the first MCPTT group, or the first network element device is a first MCPTT server. The first MCPTT server is an MCPTT server in an MCPTT system that defines the first MCPTT group.

It should be noted that the MCPTT server in the present disclosure is a network element device used for implementing a group session and user registration; and the group management server (GMS) is a network element device used for managing a group policy and maintaining group information.

Step 202. The first UE receives an association change response sent by the first network element device.

In this embodiment, a first UE sends an association change request to a first network element device, where the association change request includes request information, the request information is used to indicate that a first MCPTT user requests to change an association relationship between a second MCPTT user and a first MCPTT group, so that the first network element device sets the association relationship between the second MCPTT user and the first MCPTT group according to the association change request. Therefore, the first MCPTT user can change the association relationship between the second MCPTT user and the first MCPTT group, thereby implementing that an MCPTT user changes an association relationship between another MCPTT user and a group.

Figure 3:
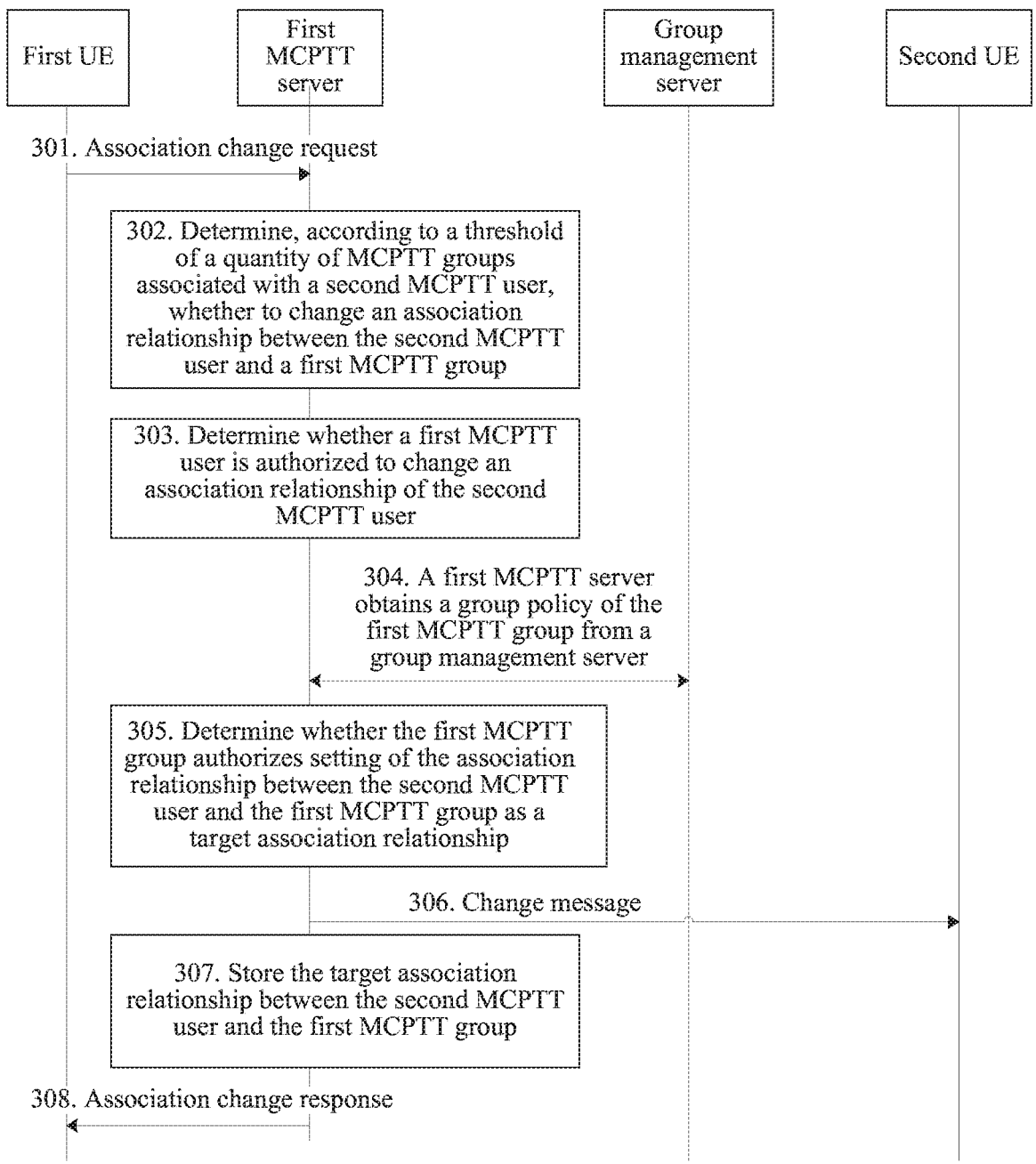
FIG. 3 is a flowchart of Embodiment 3 of a method for changing an association relationship between an MCPTT user and an MCPTT group according to the present disclosure.

FIG. 3 is a flowchart of Embodiment 3 of a method for changing an association relationship between an MCPTT user and an MCPTT group according to the present disclosure. An application scenario of this embodiment may be as follows: An MCPTT system that defines a user configuration file of a first MCPTT user, an MCPTT system that defines a user configuration file of a second MCPTT user, and an MCPTT system that defines a first MCPTT group are the same. As shown in FIG. 3, the method in this embodiment may include the following steps.

Step 301. The first UE sends an association change request to a first MCPTT server, where the association change request includes request information, and the request information is used to indicate that a first MCPTT user requests to change an association relationship between a second MCPTT user and a first MCPTT group.

The first MCPTT user is a user using the first UE. The first MCPTT server is an MCPTT server in an MCPTT system that defines the first MCPTT group.

Optionally, the association change request further includes an association relationship indication, where the association relationship indication is used to indicate that the second MCPTT user is requested to be associated with or dissociated from the first MCPTT group.

Optionally, the request information includes: a user identifier of the second MCPTT user and a group identifier of the first MCPTT group; or a group identifier of a second MCPTT group to which the second MCPTT user belongs and a group identifier of the first MCPTT group.

Optionally, the association change request further includes a user identifier of the first MCPTT user.

It should be noted that in step 301, one association change request may include an identifier of only one target MCPTT user (for example, the second MCPTT user) and an identifier of a target MCPTT group (for example, the first MCPTT group) of the target MCPTT user. Alternatively, one association change request may include user identifiers (which may be a list of user identifiers of target MCPTT users) of multiple target MCPTT users and identifiers of respective target MCPTT groups of the multiple target MCPTT users. Alternatively, one association change request may include user identifiers of multiple target MCPTT users and an identifier of one MCPTT group that corresponds to the multiple target MCPTT users.

Optionally, before step 301, the method may further include: determining, by the first UE according to input of the first MCPTT user, that the first MCPTT user requests to change the association relationship between the second MCPTT user and first MCPTT group; or determining, by the first UE according to information sent by another device, that the first MCPTT user requests to change the association relationship between the second MCPTT user and the first MCPTT group.

Step 302. The first MCPTT server determines, according to a threshold of a quantity of MCPTT groups associated with the second MCPTT user, whether to change the association relationship between the second MCPTT user and the first MCPTT group.

If yes, step 303 is performed; otherwise, the change procedure ends, or an association change response used to indicate a change failure is sent to the first UE.

Optionally, step 302 may be specifically: determining, by the first MCPTT server, whether the quantity of the MCPTT groups associated with the second MCPTT user is less than or equal to the threshold.

Step 303. The first MCPTT server determines whether the first MCPTT user is authorized to change an association relationship of the second MCPTT user.

If yes, step 304 is performed; otherwise, the change procedure ends, or an association change response used to indicate a change failure is sent to the first UE.

Optionally, the first MCPTT server may prestore a condition which needs to be met by another MCPTT user (for example, the first MCPTT user) that can change the association relationship of the second MCPTT user. For example, the condition may be a role that a user needs to play, or the condition may be: a user priority of a user needs to be greater than or equal to a preset priority.

Step 304. The first MCPTT server obtains a group policy of the first MCPTT group from a group management server.

The group management server is a group management server of the first MCPTT group.

It should be noted that when the first MCPTT server stores the group policy of the first MCPTT group, step 304 of obtaining a group policy from a group management server does not need to be performed.

It should be noted that the group management server may be inside an MCPTT system to which the first MCPTT server belongs; or the group management server may be outside an MCPTT system to which the first MCPTT server belongs, and multiple MCPTT systems share one group management server.

Step 305. The first MCPTT server determines, according to the group policy of the first MCPTT group, whether the first MCPTT group authorizes setting of the association relationship between the second MCPTT user and the first MCPTT group as a target association relationship.

If yes, step 306 is performed; otherwise, the change procedure ends, or an association change response used to indicate a change failure is sent to the first UE.

The target association relationship is determined by the first MCPTT server according to the association change request.

Optionally, the determining, by the first MCPTT server, the target association relationship according to the association change request includes: using, by the first MCPTT server, the association relationship indication included in the association change request as the target association relationship. For example, when the association relationship indication is dissociation, the target association relationship is dissociation; or when the association relationship indication is association, the target association relationship is association.

Alternatively, when the first MCPTT server determines that a current association relationship between the second MCPTT user and the first MCPTT group is dissociation, and the request information included in the association change request instructs to change the association relationship between the first MCPTT user and the first MCPTT group, it is determined that the target association relationship is association.

Alternatively, when the first MCPTT server determines that a current association relationship between the second MCPTT user and the first MCPTT group is association, and the request information included in the association change request instructs to change the association relationship between the first MCPTT user and the first MCPTT group, it is determined that the target association relationship is dissociation.

Optionally, the group policy may be a maximum value of a quantity of users in a group, a lowest user priority of an MCPTT user, or the like.

It should be noted that there is no limitation on a sequential order of the steps, namely step 302, step 303, and step 305, for determining in this embodiment.

Step 306. The first MCPTT server sends a change message to second UE.

The second MCPTT user is a user using the second UE.

Optionally, when an MCPTT system that defines a user configuration file of the second MCPTT user is different from the MCPTT system that defines the first MCPTT group, step 306 may be specifically: sending, by the first MCPTT server, the change message to the second UE by using an MCPTT server in the MCPTT system that defines the user configuration file of the second MCPTT user.

Optionally, the change message is used to indicate that the association relationship between the second MCPTT user and the first MCPTT group is the target association relationship (that is, the target association relationship determined in step 305), or the change message is used to request the second MCPTT user to set the association relationship between the second MCPTT user and the first MCPTT group as the target association relationship.

If the change message is used to request the second MCPTT user to set the association relationship between the second MCPTT user and the first MCPTT group as the target association relationship, after step 306, the method further includes: receiving, by the first MCPTT server, a change response sent by the second UE, where the change response is used to indicate that setting of the association relationship between the second MCPTT user and the first MCPTT group as the target association relationship is authorized, or the change response is used to indicate that setting of the association relationship between the second MCPTT user and the first MCPTT group as the target association relationship is not authorized.

If the change response is used to indicate that setting of the association relationship between the second MCPTT user and the first MCPTT group as the target association relationship is not authorized, an association change response used to indicate a change failure is sent to the first UE, and step 307 and step 308 are not performed any longer.

Optionally, the change message may include the user identifier of the first MCPTT user, so that the first MCPTT user can determine that an MCPTT user that changes the association relationship between the first MCPTT user and the first MCPTT group is the first MCPTT user.

Step 307. The first MCPTT server stores the target association relationship between the second MCPTT user and the first MCPTT group.

It should be noted that there is no sequential order between step 307 and step 306.

Optionally, after step 307, the method may further include: sending, by the first MCPTT server, first association information to the group management server, where the first association information is used to indicate that the association relationship between the second MCPTT user and the first MCPTT group is the target association relationship, so that the group management server updates the association relationship between the second MCPTT user and the first MCPTT group as the target association relationship.

Step 308. The first MCPTT server sends, to the first UE, an association change response used to indicate a change success.

It should be noted that there is no sequential order between step 308 and step 307.

In this embodiment, the first UE sends an association change request (the association change request includes request information, and the request information is used to indicate that a first MCPTT user requests to change an association relationship between a second MCPTT user and a first MCPTT group) to a first MCPTT server; and the first MCPTT server determines that the first MCPTT user is authorized to change an association relationship of the second MCPTT user, and after the first MCPTT group authorizes setting of the association relationship between the second MCPTT user and the first MCPTT group as a target association relationship, the first MCPTT server sends a change message (the change message is used to indicate that the association relationship between the second MCPTT user and the first MCPTT group is the target association relationship; or the change message is used to request the second MCPTT user to set the association relationship between the second MCPTT user and the first MCPTT group as the target association relationship) to second UE. Therefore, the first MCPTT user can change an association relationship between the first MCPTT user and the first MCPTT group, thereby implementing that an MCPTT user changes an association relationship between another MCPTT user and a group.

Figure 4:
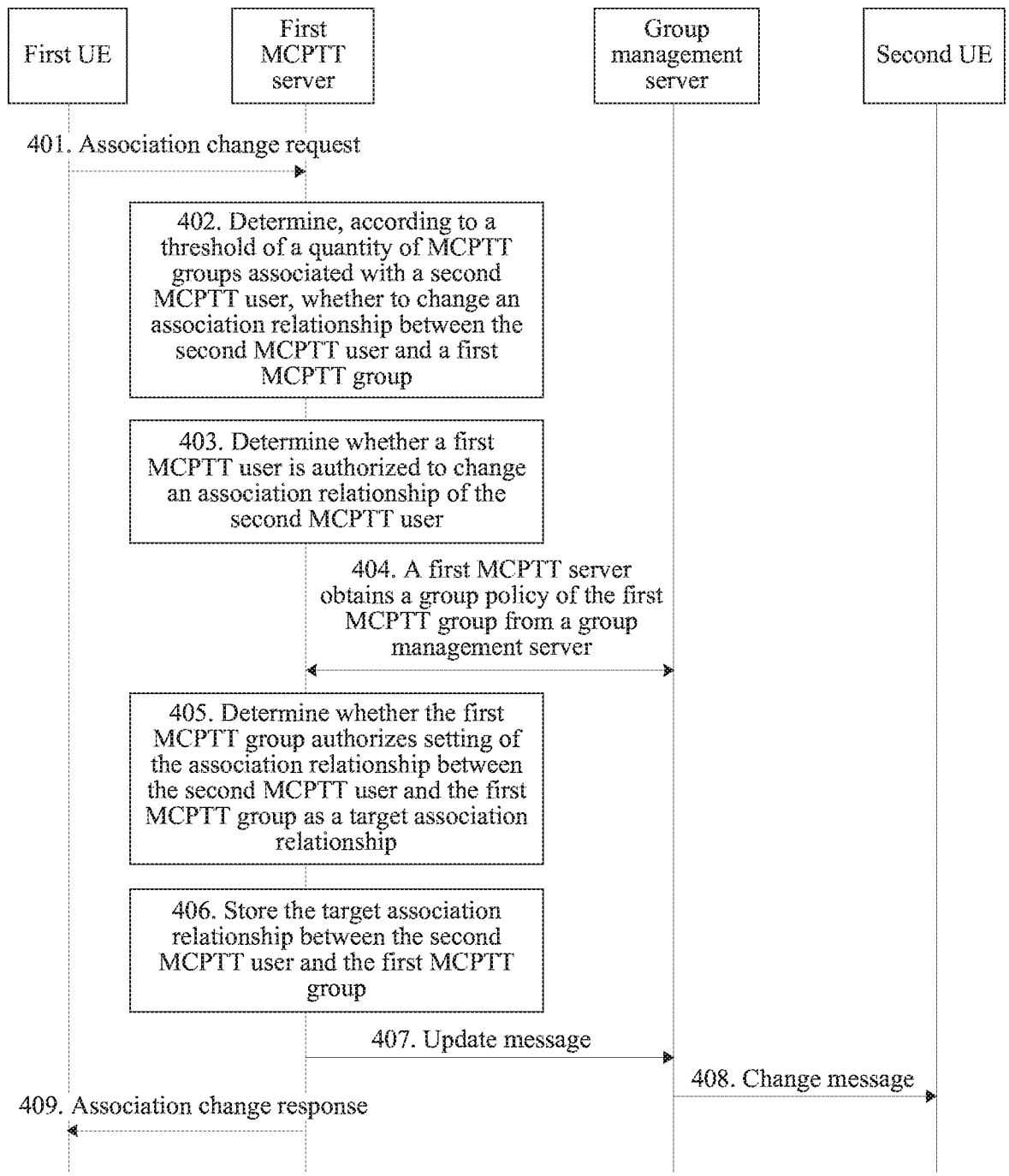
FIG. 4 is a flowchart of Embodiment 4 of a method for changing an association relationship between an MCPTT user and an MCPTT group according to the present disclosure.

FIG. 4 is a flowchart of Embodiment 4 of a method for changing an association relationship between an MCPTT user and an MCPTT group according to the present disclosure. An application scenario of this embodiment is the same as the application scenario of the embodiment shown in FIG. 3. As shown in FIG. 4, the method in this embodiment may include the following steps.

Step 401. The first UE sends an association change request to a first MCPTT server, where the association change request includes request information, and the request information is used to indicate that a first MCPTT user requests to change an association relationship between a second MCPTT user and a first MCPTT group.

It should be noted that step 401 is similar to step 301, and details are no longer described herein.

Step 402. The first MCPTT server determines, according to a threshold of a quantity of MCPTT groups associated with the second MCPTT user, whether to change the association relationship between the second MCPTT user and the first MCPTT group.

If yes, step 403 is performed; otherwise, the change procedure ends, or an association change response used to indicate a change failure is sent to the first UE.

It should be noted that step 402 is similar to step 302, and details are no longer described herein.

Step 403. The first MCPTT server determines whether the first MCPTT user is authorized to change an association relationship of the second MCPTT user.

If yes, step 404 is performed; otherwise, the change procedure ends, or an association change response used to indicate a change failure is sent to the first UE.

It should be noted that step 403 is similar to step 303, and details are no longer described herein.

Step 404. The first MCPTT server obtains a group policy of the first MCPTT group from a group management server.

It should be noted that step 404 is similar to step 304, and details are no longer described herein.

Step 405. The first MCPTT server determines, according to the group policy of the first MCPTT group, whether the first MCPTT group authorizes setting of the association relationship between the second MCPTT user and the first MCPTT group as a target association relationship.

If yes, step 406 is performed; otherwise, the change procedure ends, or an association change response used to indicate a change failure is sent to the first UE.

It should be noted that step 405 is similar to step 305, and details are no longer described herein.

Step 406. The first MCPTT server stores the target association relationship between the second MCPTT user and the first MCPTT group.

Step 407. The first MCPTT server sends an update message to the group management server, where the update message is used to indicate that the association relationship between the second MCPTT user and the first MCPTT group is the target association relationship.

It should be noted that there is no sequential order between step 407 and step 406.

Step 408. The group management server sends a change message to second UE after receiving the update message.

The change message is used to indicate that the association relationship between the second MCPTT user and the first MCPTT group is the target association relationship; and the second MCPTT user is a user using the second UE.

Optionally, step 408 may further include: storing, by the group management server, the target association relationship between the second MCPTT user and the first MCPTT group.

It should be noted that because in step 408, a condition for triggering the group management server to send the change message to the second UE is that the group management server receives the update message sent by the first MCPTT server, step 408 may also be considered as: the first MCPTT server sends a change message to second UE.

Step 409. The first MCPTT server sends, to the first UE, an association change response used to indicate a change success.

It should be noted that there is no sequential order between step 409 and step 406 to step 408.

In this embodiment, the first UE sends an association change request (the association change request includes request information, and the request information is used to indicate that a first MCPTT user requests to change an association relationship between a second MCPTT user and a first MCPTT group) to a first MCPTT server; and the first MCPTT server determines that the first MCPTT user is authorized to change an association relationship of the second MCPTT user, and after the first MCPTT group authorizes setting of the association relationship between the second MCPTT user and the first MCPTT group as a target association relationship, the first MCPTT server sends an update message to a group management server, so that the group management server sends a change message (the change message is used to indicate that the association relationship between the second MCPTT user and the first MCPTT group is the target association relationship) to second UE. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 4 and the embodiment shown in FIG. 3 mainly have the following differences: (1) In the embodiment shown in FIG. 3, the first MCPTT server sends the change message to the second UE, while in the embodiment shown in FIG. 4, the group management server sends the change message to the second UE. (2) In the embodiment shown in FIG. 4, the change message is used to indicate that the association relationship between the second MCPTT user and the first MCPTT group is the target association relationship, while in the embodiment shown in FIG. 3, the change message is used to indicate that the association relationship between the second MCPTT user and the first MCPTT group is the target association relationship, or is used to request the second MCPTT user to set the association relationship between the second MCPTT user and the first MCPTT group as the target association relationship.

Figure 5:
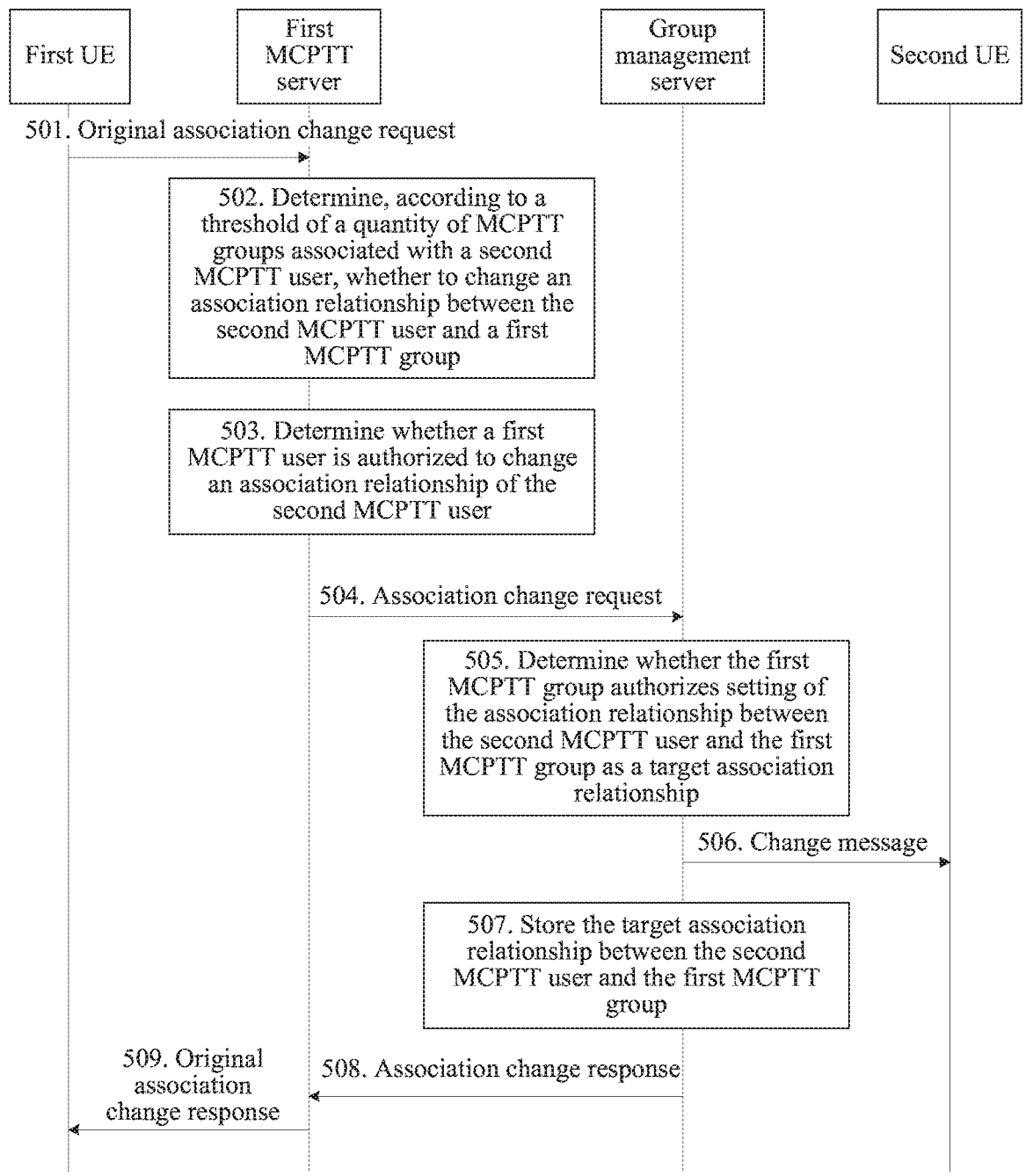
FIG. 5 is a flowchart of Embodiment 5 of a method for changing an association relationship between an MCPTT user and an MCPTT group according to the present disclosure.

FIG. 5 is a flowchart of Embodiment 5 of a method for changing an association relationship between an MCPTT user and an MCPTT group according to the present disclosure. An application scenario of this embodiment is the same as the application scenario of the embodiment shown in FIG. 3. As shown in FIG. 5, the method in this embodiment may include the following steps.

Step 501. The first UE sends an original association change request to a first MCPTT server, where the original association change request includes request information, and the request information is used to indicate that a first MCPTT user requests to change an association relationship between a second MCPTT user and a first MCPTT group.

It should be noted that step 501 is similar to step 301, and details are no longer described herein.

Step 502. The first MCPTT server determines, according to a threshold of a quantity of MCPTT groups associated with the second MCPTT user, whether to change the association relationship between the second MCPTT user and the first MCPTT group.

If yes, step 503 is performed; otherwise, the change procedure ends, or an original association change response used to indicate a change failure is sent to the first UE.

Step 503. The first MCPTT server determines whether the first MCPTT user is authorized to change an association relationship of the second MCPTT user.

If yes, step 504 is performed; otherwise, the change procedure ends, or an original association change response used to indicate a change failure is sent to the first UE.

It should be noted that step 503 is similar to step 303, and details are no longer described herein.

Step 504. The first MCPTT server sends an association change request to a group management server according to the original association change request.

The group management server is a group management server of the first MCPTT group. The association change request includes request information, and the request information is used to indicate that the first MCPTT user requests to change the association relationship between the second MCPTT user and the first MCPTT group.

Optionally, the association change request and the original association change request may be a same message (that is, the first MCPTT server directly forwards the received original association change request to the group management server); or the association change request and the original association change request may be different messages.

For example, the original association change request includes user identifiers of a target MCPTT user 1 and a target MCPTT user 2, an identifier of a target MCPTT group 1, and an identifier of a target MCPTT group 2; the target MCPTT user 1 corresponds to the target MCPTT group 1, the target MCPTT user 2 corresponds to the target MCPTT group 2; and an MCPTT server in an MCPTT system that defines the target MCPTT group 1 is an MCPTT server A, and an MCPTT server in an MCPTT system that defines the target MCPTT group 2 is an MCPTT server B. In this case, an association change request received by a group management server of the target MCPTT group 1 does not include related information of the target MCPTT user 2 and the target MCPTT group 2, and an association change request received by a group management server of the target MCPTT group 2 does not include related information of the target MCPTT user 1 and the target MCPTT group 1.

It should be noted that, regardless of whether the original association change request and the association change request are a same message, the group management server may consider that the group management server receives the association change request sent by the first UE.

Step 505. The group management server determines, according to the group policy of the first MCPTT group, whether the first MCPTT group authorizes setting of the association relationship between the second MCPTT user and the first MCPTT group as a target association relationship.

If yes, step 506 is performed; otherwise, the change procedure ends, or an original association change response used to indicate a change failure is sent to the first UE.

It should be noted that a difference between step 505 and step 305 only lies in different execution bodies, and the remaining parts are similar. Details are no longer described herein.

Step 506. The group management server sends a change message to second UE.

The second MCPTT user is a user using the second UE.

Optionally, when an MCPTT system that defines a user configuration file of the second MCPTT user is different from an MCPTT system that defines the first MCPTT group, step 506 may be specifically: sending, by the group management server, the change message to the second UE by using an MCPTT server in the MCPTT system that defines the user configuration file of the second MCPTT user.

Optionally, the change message is used to indicate that the association relationship between the second MCPTT user and the first MCPTT group is the target association relationship (that is, the target association relationship determined in step 505), or the change message is used to request the second MCPTT user to set the association relationship between the second MCPTT user and the first MCPTT group as the target association relationship.

If the change message is used to request the second MCPTT user to set the association relationship between the second MCPTT user and the first MCPTT group as the target association relationship, after step 506, the method further includes:

receiving, by the group management server, a change response sent by the second UE, where the change response is used to indicate that setting of the association relationship between the second MCPTT user and the first MCPTT group as the target association relationship is authorized, or the change response is used to indicate that setting of the association relationship between the second MCPTT user and the first MCPTT group as the target association relationship is not authorized.

If the change response is used to indicate that setting of the association relationship between the second MCPTT user and the first MCPTT group as the target association relationship is not authorized, an original association change response used to indicate a change failure is sent to the first UE, and step 507 to step 509 are not performed any longer.

Step 507. The group management server stores the target association relationship between the second MCPTT user and the first MCPTT group.

It should be noted that there is no sequential order between step 507 and step 506.

Optionally, after step 507, the method may further include: sending, by the group management server, second association information to the first MCPTT server, where the second association information is used to indicate that the association relationship between the second MCPTT user and the first MCPTT group is the target association relationship, so that the first MCPTT server updates the association relationship between the second MCPTT user and the first MCPTT group as the target association relationship.

Step 508. The group management server sends, to the first MCPTT server, an association change response used to indicate a change success.

It should be noted that there is no sequential order between step 508 and step 507.

Step 509. The first MCPTT server sends an original association change response to the first UE according to the association change response.

The original association change response is a response message corresponding to the original association change request. A relationship between the original association change response and the association change response is similar to a relationship between the original association change request and the association change request. That is, the association change response and the original association change response may be a same message; or the original association change response may be obtained by the first MCPTT server according to an association change response sent by one group management server (or multiple group management servers).

It should be noted that, regardless of whether the original association change response and the association change response are a same message, the group management server may consider that the group management server sends the association change response to the first UE.

In this embodiment, the first UE sends an original association change request (the original association change request includes request information, and the request information is used to indicate that a first MCPTT user requests to change an association relationship between a second MCPTT user and a first MCPTT group) to a first MCPTT server; after determining that the first MCPTT user is authorized to change an association relationship of the second MCPTT user, the first MCPTT server sends an association change request to a group management server; and after determining that the first MCPTT group authorizes setting of the association relationship between the second MCPTT user and the first MCPTT group as a target association relationship, the group management server sends a change message (the change message is used to indicate that the association relationship between the second MCPTT user and the first MCPTT group is the target association relationship; or the change message is used to request the second MCPTT user to set the association relationship between the second MCPTT user and the first MCPTT group as the target association relationship) to second UE. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 5 and the embodiment shown in FIG. 3 mainly have the following difference: The method in the embodiment shown in FIG. 5 is mainly performed by the group management server, while the method in the embodiment shown in FIG. 3 is mainly performed by the first MCPTT server. However, in either of the embodiments shown in FIG. 3 and FIG. 5, the step of determining whether the first MCPTT user is authorized to change an association relationship of the second MCPTT user is performed by the first MCPTT server.

Figure 6:
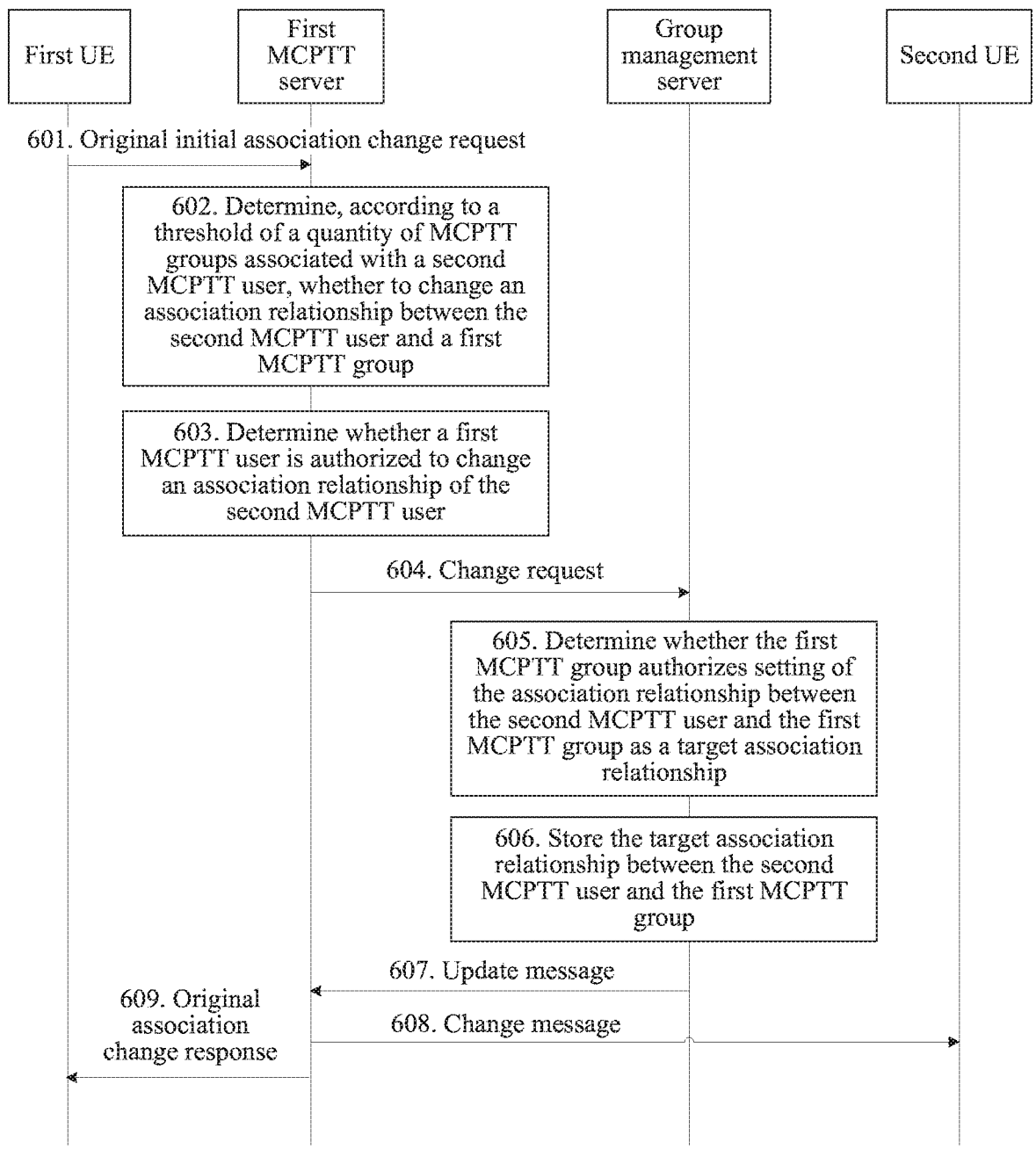
FIG. 6 is a flowchart of Embodiment 6 of a method for changing an association relationship between an MCPTT user and an MCPTT group according to the present disclosure.

FIG. 6 is a flowchart of Embodiment 6 of a method for changing an association relationship between an MCPTT user and an MCPTT group according to the present disclosure. An application scenario of this embodiment is the same as the application scenario of the embodiment shown in FIG. 3. As shown in FIG. 6, the method in this embodiment may include the following steps.

Step 601. The first UE sends an original association change request to a first MCPTT server, where the original association change request includes request information, and the request information is used to indicate that a first MCPTT user requests to change an association relationship between a second MCPTT user and a first MCPTT group.

It should be noted that step 601 is similar to step 301, and details are no longer described herein.

Step 602. The first MCPTT server determines, according to a threshold of a quantity of MCPTT groups associated with the second MCPTT user, whether to change the association relationship between the second MCPTT user and the first MCPTT group.

If yes, step 603 is performed; otherwise, the change procedure ends, or an original association change response used to indicate a change failure is sent to the first UE.

Step 603. The first MCPTT server determines whether the first MCPTT user is authorized to change an association relationship of the second MCPTT user.

If yes, step 604 is performed; otherwise, the change procedure ends, or an original association change response used to indicate a change failure is sent to the first UE.

It should be noted that step 603 is similar to step 303, and details are no longer described herein.

Step 604. The first MCPTT server sends an association change request to a group management server according to the original association change request.

The group management server is a group management server of the first MCPTT group.

The association change request includes request information, and the request information is used to indicate that the first MCPTT user requests to change the association relationship between the second MCPTT user and the first MCPTT group.

It should be noted that step 604 is similar to step 504, and details are no longer described herein.

Step 605. The group management server determines, according to a group policy of the first MCPTT group, whether the first MCPTT group authorizes setting of the association relationship between the second MCPTT user and the first MCPTT group as a target association relationship.

If yes, step 606 is performed; otherwise, the change procedure ends, or an original association change response used to indicate a change failure is sent to the first UE.

It should be noted that step 605 is similar to step 505, and details are no longer described herein.

Step 606. The group management server stores the target association relationship between the second MCPTT user and the first MCPTT group.

Step 607. The group management server sends an update message to the first MCPTT server, where the update message is used to indicate that the association relationship between the second MCPTT user and the first MCPTT group is the target association relationship.

It should be noted that there is no sequential order between step 607 and step 606.

Step 608. The first MCPTT server sends a change message to second UE after receiving the update message.

The change message is used to indicate that the association relationship between the second MCPTT user and the first MCPTT group is the target association relationship; and the second MCPTT user is a user using the second UE.

Optionally, step 608 may further include: storing, by the first MCPTT server, the target association relationship between the second MCPTT user and the first MCPTT group.

It should be noted that because in step 608, a condition for triggering the first MCPTT server to send the change message to the second UE is that the first MCPTT server receives the update message sent by the group management server, step 608 may also be considered as: the group management server sends a change message to second UE.

Step 609. The first MCPTT server sends, to the first UE, an original association change response used to indicate a change success.

In this embodiment, the first UE sends an original association change request (the original association change request includes request information, and the request information is used to indicate that a first MCPTT user requests to change an association relationship between a second MCPTT user and a first MCPTT group) to a first MCPTT server; after determining that the first MCPTT user is authorized to change an association relationship of the second MCPTT user, the first MCPTT server sends an association change request to a group management server; and after determining that the first MCPTT group authorizes setting of the association relationship between the second MCPTT user and the first MCPTT group as a target association relationship, the group management server sends an update message to the first MCPTT server, so that the first MCPTT server sends a change message (the change message is used to indicate that the association relationship between the second MCPTT user and the first MCPTT group is the target association relationship) to second UE. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 6 and the embodiment shown in FIG. 5 mainly have the following differences: (1) In the embodiment shown in FIG. 5, the group management server sends the change message to the second UE, while in the embodiment shown in FIG. 6, the first MCPTT server sends the change message to the second UE. (2) In the embodiment shown in FIG. 6, the change message is used to indicate that the association relationship between the second MCPTT user and the first MCPTT group is the target association relationship, while in the embodiment shown in FIG. 5, the change message is used to indicate that the association relationship between the second MCPTT user and the first MCPTT group is the target association relationship, or is used to request the second MCPTT user to set the association relationship between the second MCPTT user and the first MCPTT group as the target association relationship.

Figure 7:
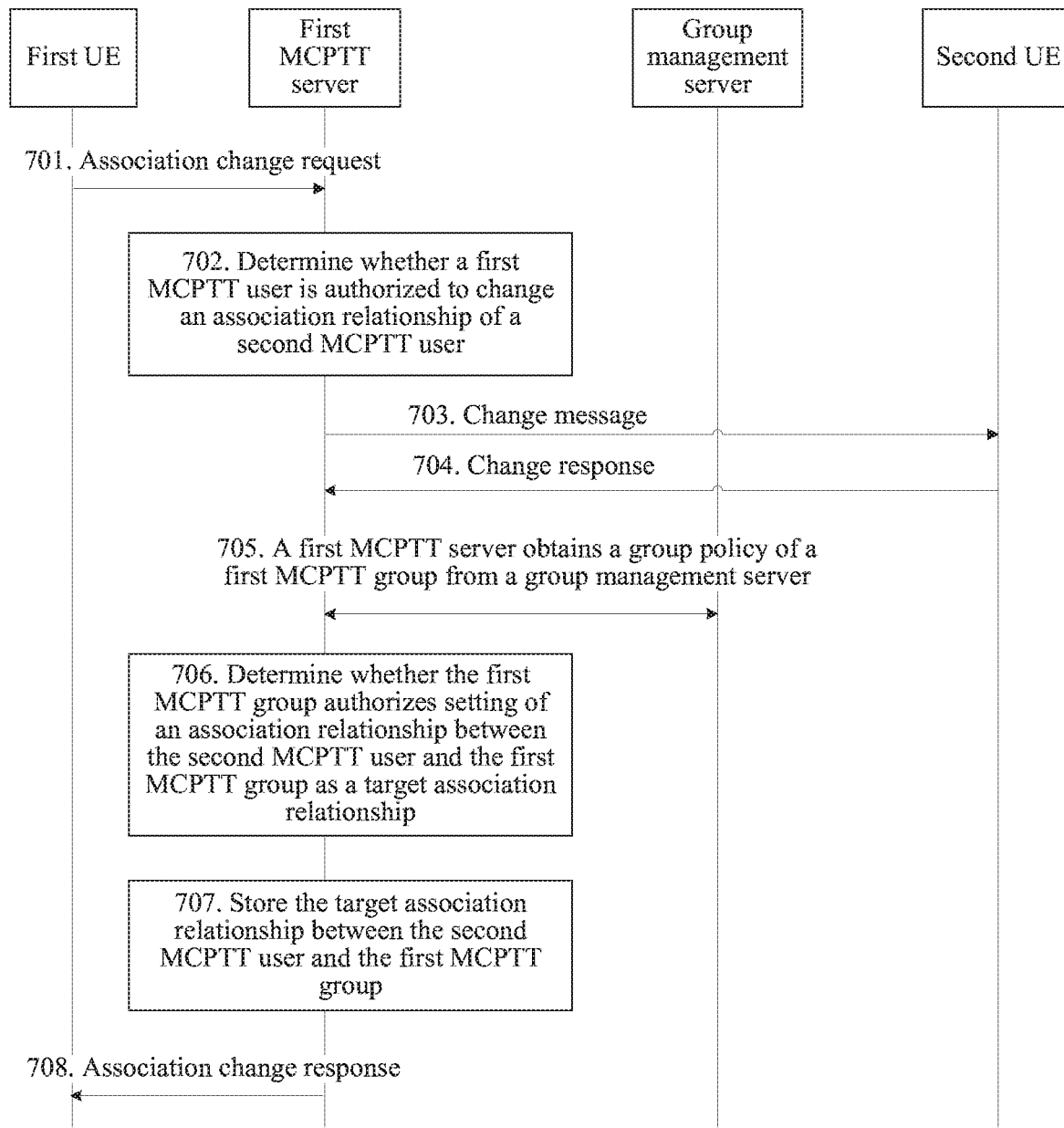
FIG. 7 is a flowchart of Embodiment 7 of a method for changing an association relationship between an MCPTT user and an MCPTT group according to the present disclosure.

FIG. 7 is a flowchart of Embodiment 7 of a method for changing an association relationship between an MCPTT user and an MCPTT group according to the present disclosure. An application scenario of this embodiment is the same as the application scenario of the embodiment shown in FIG. 3. As shown in FIG. 7, the method in this embodiment may include the following steps.

Step 701. The first UE sends an association change request to a first MCPTT server, where the association change request includes request information, and the request information is used to indicate that a first MCPTT user requests to change an association relationship between a second MCPTT user and a first MCPTT group.

It should be noted that step 701 is similar to step 301, and details are no longer described herein.

Step 702. The first MCPTT server determines whether the first MCPTT user is authorized to change an association relationship of the second MCPTT user.

If yes, step 703 is performed; otherwise, the change procedure ends, or an association change response used to indicate a change failure is sent to the first UE.

It should be noted that step 702 is similar to step 303, and details are no longer described herein.

It should be noted that in this embodiment, the first MCPTT server may also perform the determining described in step 302.

Step 703. The first MCPTT server sends a change message to second UE.

The change message is used to request the second MCPTT user to set the association relationship between the second MCPTT user and the first MCPTT group as a target association relationship.

Step 704. The second UE sends a change response to the first MCPTT server.

The change response is used to indicate that setting of the association relationship between the second MCPTT user and the first MCPTT group as the target association relationship is authorized.

It should be noted that, before step 704, the method may further include: determining, by the second UE according to input of a user, that the second MCPTT user authorizes setting of the association relationship between the second MCPTT user and the first MCPTT group as the target association relationship.

Step 705. The first MCPTT server obtains a group policy of the first MCPTT group from a group management server.

It should be noted that step 705 is similar to step 304, and details are no longer described herein.

Step 706. The first MCPTT server determines, according to the group policy of the first MCPTT group, whether the first MCPTT group authorizes setting of the association relationship between the second MCPTT user and the first MCPTT group as a target association relationship.

If yes, step 707 is performed; otherwise, the change procedure ends, or an association change response used to indicate a change failure is sent to the first UE.

Step 707. The first MCPTT server stores the target association relationship between the second MCPTT user and the first MCPTT group.

Step 708. The first MCPTT server sends, to the first UE, an association change response used to indicate a change success.

It should be noted that there is no sequential order between step 708 and step 707.

In this embodiment, the first UE sends an association change request (the association change request includes request information, and the request information is used to indicate that a first MCPTT user requests to change an association relationship between a second MCPTT user and a first MCPTT group) to a first MCPTT server; and after determining that the second MCPTT user authorizes setting of the association relationship between the second MCPTT user and the first MCPTT group as a target association relationship, the first MCPTT server further determines whether the first MCPTT group authorizes setting of the association relationship between the second MCPTT user and the first MCPTT group as the target association relationship, and when the first MCPTT group authorizes the setting, the first MCPTT server stores the target association relationship between the second MCPTT user and the first MCPTT group. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 7 and the embodiment shown in FIG. 3 mainly have the following difference: In the embodiment shown in FIG. 3, after the first MCPTT group authorizes setting of an association relationship between the second MCPTT user and a first MCPTT group as a target association relationship, a change message is sent to the second UE; while in the embodiment shown in FIG. 7, before the first MCPTT group authorizes setting of an association relationship between the second MCPTT user and the first MCPTT group as a target association relationship, a change message is sent to the second UE, to ask for permission from the second MCPTT user.

Figure 8:
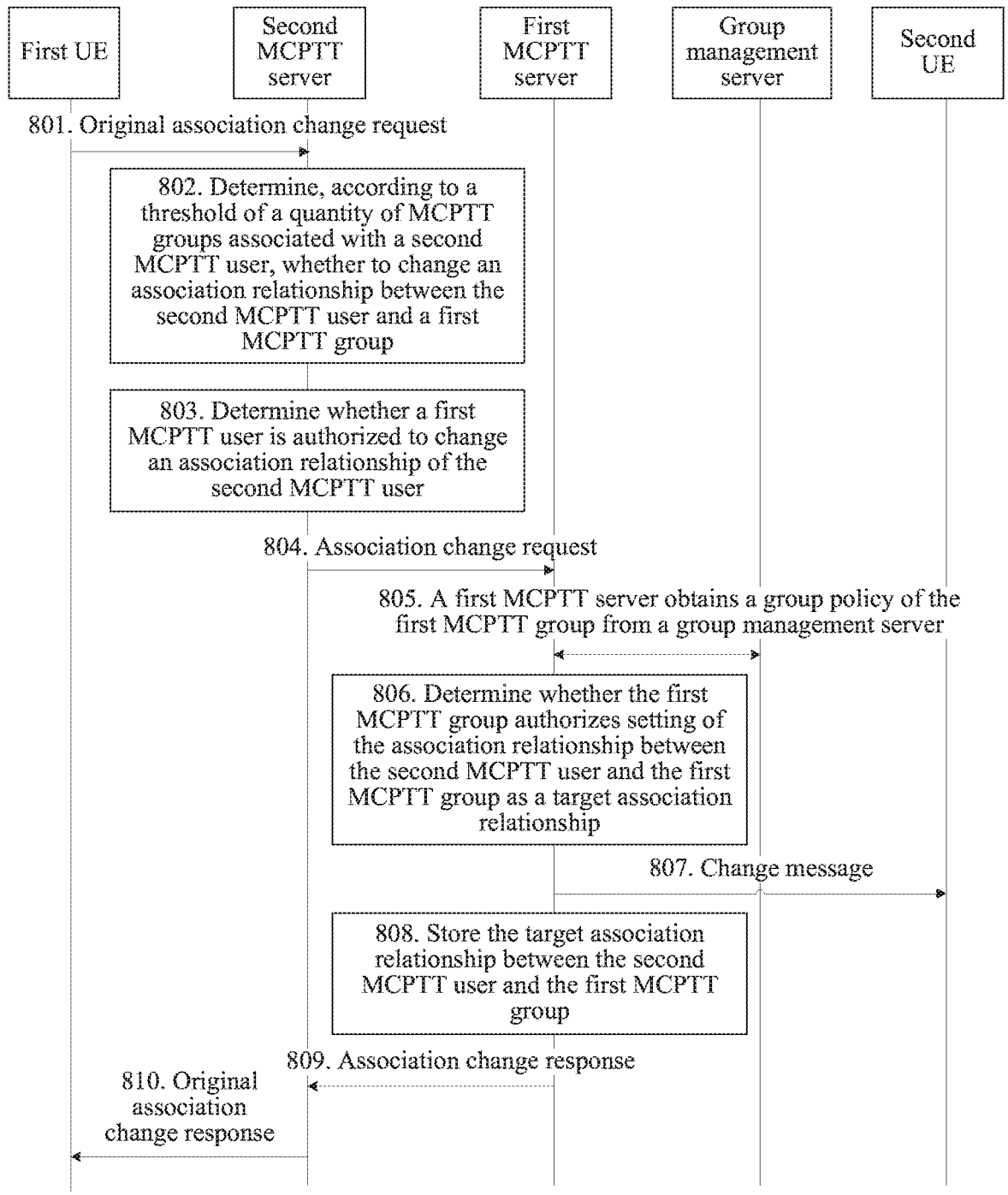
FIG. 8 is a flowchart of Embodiment 8 of a method for changing an association relationship between an MCPTT user and an MCPTT group according to the present disclosure.

FIG. 8 is a flowchart of Embodiment 8 of a method for changing an association relationship between an MCPTT user and an MCPTT group according to the present disclosure. An application scenario of this embodiment may be as follows: An MCPTT system that defines a user configuration file of a first MCPTT user and an MCPTT system that defines a user configuration file of a second MCPTT user are the same, but are different from an MCPTT system that defines a first MCPTT group. As shown in FIG. 8, the method in this embodiment may include the following steps.

Step 801. The first UE sends an original association change request to a second MCPTT server, where the original association change request includes request information, and the request information is used to indicate that a first MCPTT user requests to change an association relationship between a second MCPTT user and a first MCPTT group.

The second MCPTT server is an MCPTT server in an MCPTT system that defines a user configuration file of the first MCPTT user.

It should be noted that step 801 is similar to step 301, and details are no longer described herein.

Step 802. The second MCPTT server determines, according to a threshold of a quantity of MCPTT groups associated with the second MCPTT user, whether to change the association relationship between the second MCPTT user and the first MCPTT group.

If yes, step 803 is performed; otherwise, the change procedure ends, or an original association change response used to indicate a change failure is sent to the first UE.

Step 803. The second MCPTT server determines whether the first MCPTT user is authorized to change an association relationship of the second MCPTT user.

If yes, step 804 is performed; otherwise, the change procedure ends, or an original association change response used to indicate a change failure is sent to the first UE.

It should be noted that a difference between step 803 and step 303 only lies in different execution bodies, and the remaining parts are similar. Details are no longer described herein.

It should be noted that there is no limitation on a sequential order of the steps, namely step 802 and step 803, for determining in this embodiment.

Step 804. The second MCPTT server sends an association change request to a first MCPTT server according to the original association change request.

The association change request includes request information, and the request information is used to indicate that the first MCPTT user requests to change the association relationship between the second MCPTT user and the first MCPTT group.

Step 805. The first MCPTT server obtains a group policy of the first MCPTT group from a group management server.

It should be noted that step 805 is similar to step 304, and details are no longer described herein.

Step 806. The first MCPTT server determines, according to the group policy of the first MCPTT group, whether the first MCPTT group authorizes setting of the association relationship between the second MCPTT user and the first MCPTT group as a target association relationship.

If yes, step 807 is performed; otherwise, the change procedure ends, or an original association change response used to indicate a change failure is sent to the first UE.

It should be noted that step 806 is similar to step 305, and details are no longer described herein.

Step 807. The first MCPTT server sends a change message to second UE.

The second MCPTT user is a user using the second UE.

It should be noted that step 807 is similar to step 306, and details are no longer described herein.

Step 808. The first MCPTT server stores the target association relationship between the second MCPTT user and the first MCPTT group.

It should be noted that there is no sequential order between step 808 and step 807.

It should be noted that step 808 is similar to step 307, and details are no longer described herein.

Step 809. The first MCPTT server sends, to the second MCPTT server, an association change response used to indicate a change success.

Step 810. The second MCPTT server sends an original association change response to the first UE according to the association change response.

It should be noted that a relationship between the original association change request and the association change request and a relationship between the original association change response and the association change response in this embodiment are the same as those in the embodiment shown in FIG. 5.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the first MCPTT user is authorized to change an association relationship of the second MCPTT user, the second MCPTT server sends an association change request to a first MCPTT server; and after determining that the first MCPTT group authorizes setting of the association relationship between the second MCPTT user and the first MCPTT group as a target association relationship, the first MCPTT server sends a change message (the change message is used to indicate that the association relationship between the second MCPTT user and the first MCPTT group is the target association relationship; or the change message is used to request the second MCPTT user to set the association relationship between the second MCPTT user and the first MCPTT group as the target association relationship) to second UE. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 8 and the embodiment shown in FIG. 3 mainly have the following difference: In the embodiment shown in FIG. 8, the first UE sends an original association change request to the second MCPTT server, and after determining that the first MCPTT user is authorized to change an association relationship of the second MCPTT user, the second MCPTT server sends an association change request to the first MCPTT server; while in FIG. 3, the first UE directly sends an association change request to the first MCPTT server, and the first MCPTT server determines whether the first MCPTT user is authorized to change an association relationship of the second MCPTT user.

It should be noted that the foregoing difference between the embodiment shown in FIG. 8 and the embodiment shown in FIG. 3 may further be applied to the embodiment shown in FIG. 4, to form a new technical solution.

Figure 9:
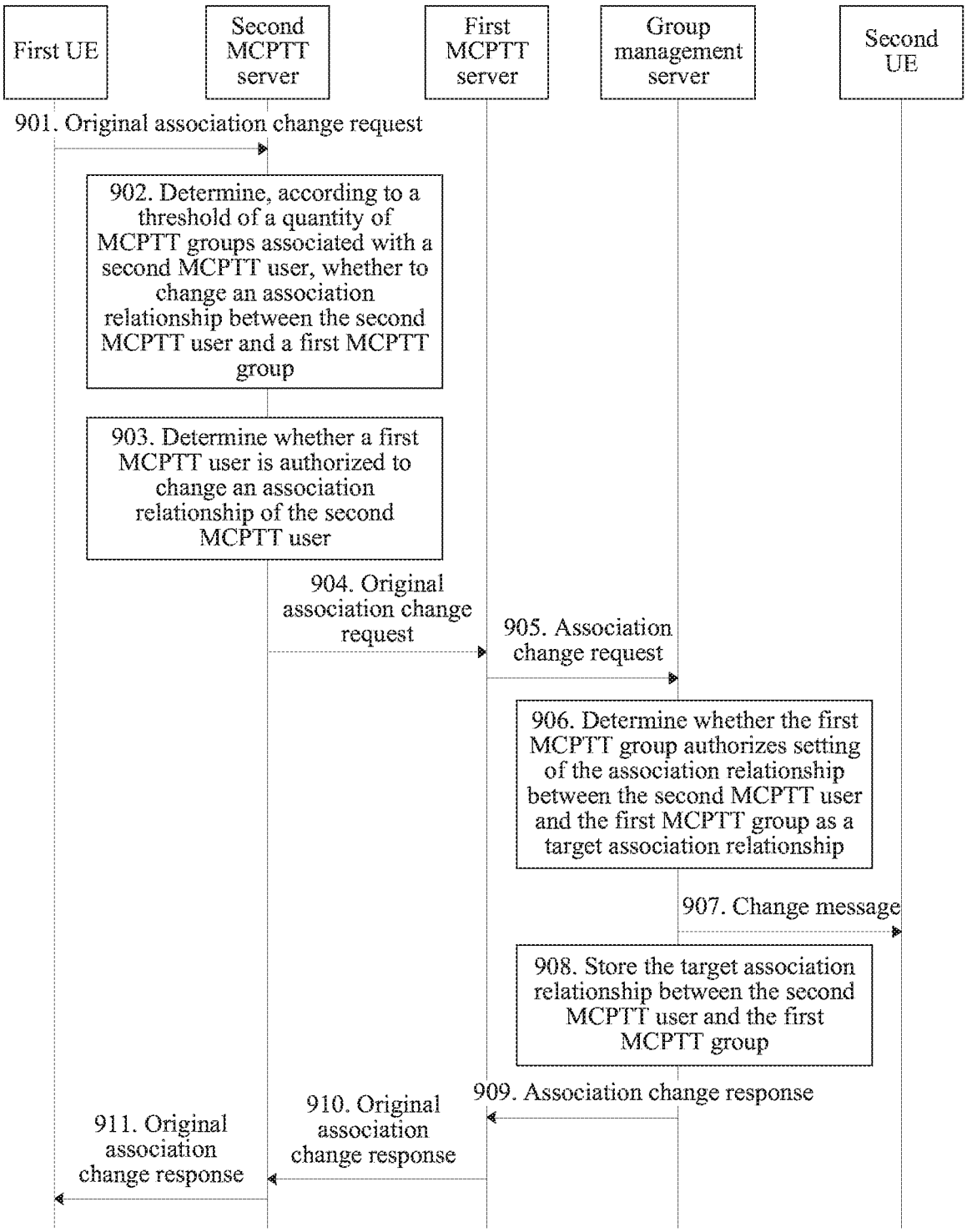
FIG. 9 is a flowchart of Embodiment 9 of a method for changing an association relationship between an MCPTT user and an MCPTT group according to the present disclosure.

FIG. 9 is a flowchart of Embodiment 9 of a method for changing an association relationship between an MCPTT user and an MCPTT group according to the present disclosure. An application scenario of this embodiment is the same as the application scenario of the embodiment shown in FIG. 8. As shown in FIG. 9, the method in this embodiment may include the following steps.

Step 901. The first UE sends an original association change request to a second MCPTT server, where the original association change request includes request information, and the request information is used to indicate that a first MCPTT user requests to change an association relationship between a second MCPTT user and a first MCPTT group.

It should be noted that step 901 is similar to step 801, and details are no longer described herein.

Step 902. The second MCPTT server determines, according to a threshold of a quantity of MCPTT groups associated with the second MCPTT user, whether to change the association relationship between the second MCPTT user and the first MCPTT group.

If yes, step 903 is performed; otherwise, the change procedure ends, or an original association change response used to indicate a change failure is sent to the first UE.

Step 903. The second MCPTT server determines whether the first MCPTT user is authorized to change an association relationship of the second MCPTT user.

If yes, step 904 is performed; otherwise, the change procedure ends, or an original association change response used to indicate a change failure is sent to the first UE.

It should be noted that step 903 is similar to step 803, and details are no longer described herein.

Step 904. The second MCPTT server forwards the original association change request to a first MCPTT server.

It should be noted that step 904 is similar to step 804, and details are no longer described herein.

Step 905. The first MCPTT server sends an association change request to a group management server according to the original association change request.

Step 906. The group management server determines, according to a group policy of the first MCPTT group, whether the first MCPTT group authorizes setting of the association relationship between the second MCPTT user and the first MCPTT group as a target association relationship.

It should be noted that step 906 is similar to step 505, and details are no longer described herein.

Step 907. The group management server sends a change message to second UE.

The second MCPTT user is a user using the second UE.

It should be noted that step 907 is similar to step 506, and details are no longer described herein.

Step 908. The group management server stores the target association relationship between the second MCPTT user and the first MCPTT group.

It should be noted that there is no sequential order between step 908 and step 907.

It should be noted that step 908 is similar to step 507, and details are no longer described herein.

Step 909. The group management server sends, to the first MCPTT server, an association change response used to indicate a change success.

It should be noted that there is no sequential order between step 909 and step 908.

Step 910. The first MCPTT server sends an original association change response to the second MCPTT server according to the association change response.

Step 911. The second MCPTT server forwards the original association change response to the first UE.

It should be noted that a relationship between the original association change request and the association change request and a relationship between the original association change response and the association change response in this embodiment are the same as those in the embodiment shown in FIG. 5.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the first MCPTT user is authorized to change an association relationship of the second MCPTT user, the second MCPTT server sends an association change request to a group management server by using a first MCPTT server; and after determining that the first MCPTT group authorizes setting of the association relationship between the second MCPTT user and the first MCPTT group as a target association relationship, the group management server sends a change message (the change message is used to indicate that the association relationship between the second MCPTT user and the first MCPTT group is the target association relationship; or the change message is used to request the second MCPTT user to set the association relationship between the second MCPTT user and the first MCPTT group as the target association relationship) to second UE. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 9 and the embodiment shown in FIG. 5 mainly have the following difference: In the embodiment shown in FIG. 9, the first UE sends an original association change request to the second MCPTT server, and after determining that the first MCPTT user is authorized to change an association relationship of the second MCPTT user, the second MCPTT server sends an association change request to the first MCPTT server; while in FIG. 5, the first UE directly sends an association change request to the first MCPTT server, and the first MCPTT server determines whether the first MCPTT user is authorized to change an association relationship of the second MCPTT user.

It should be noted that the foregoing difference between the embodiment shown in FIG. 9 and the embodiment shown in FIG. 5 may further be applied to the embodiment shown in FIG. 6, to form a new technical solution.

Figure 10:
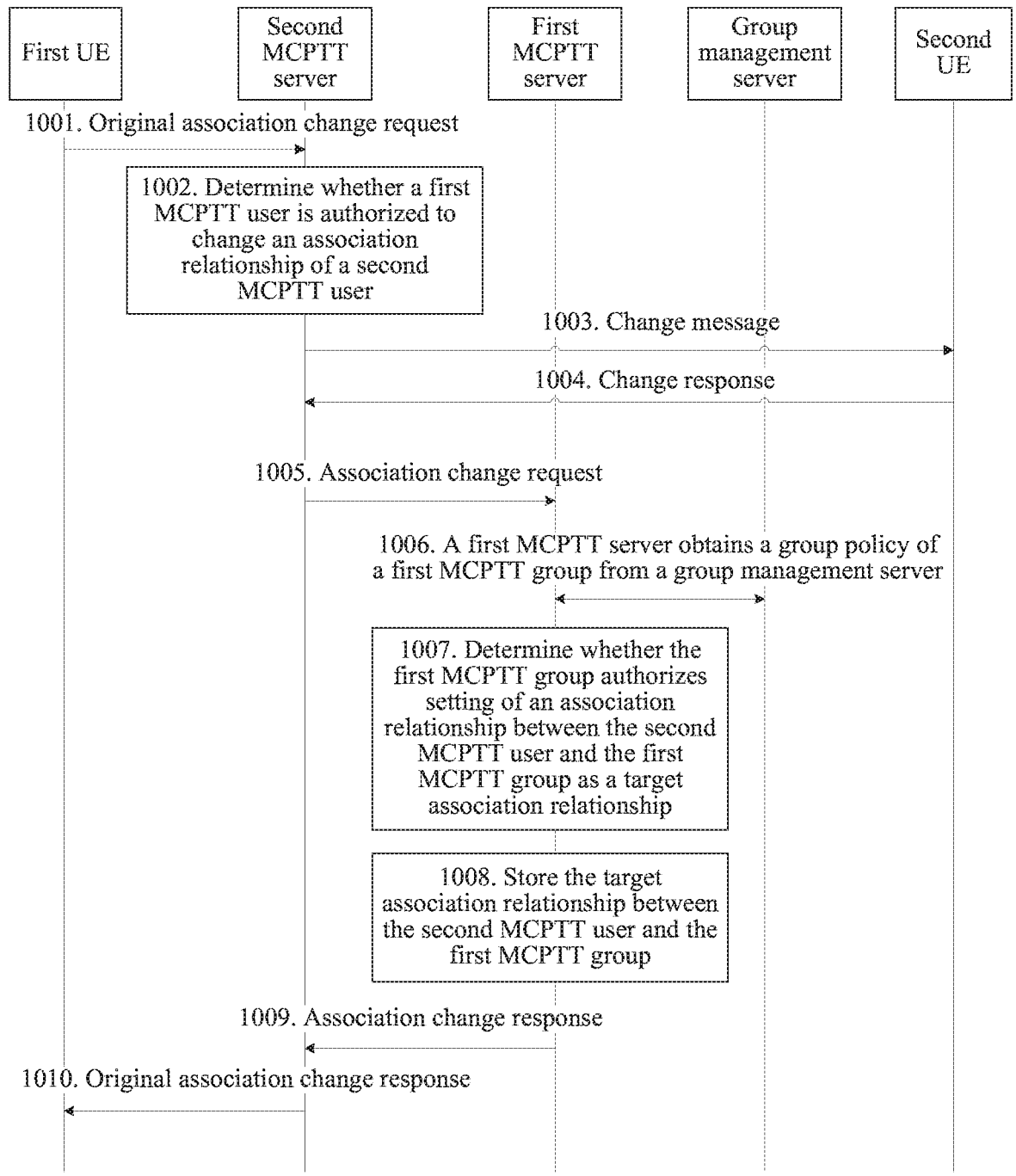
FIG. 10 is a flowchart of Embodiment 10 of a method for changing an association relationship between an MCPTT user and an MCPTT group according to the present disclosure.

FIG. 10 is a flowchart of Embodiment 10 of a method for changing an association relationship between an MCPTT user and an MCPTT group according to the present disclosure. An application scenario of this embodiment is the same as the application scenario of the embodiment shown in FIG. 8. As shown in FIG. 10, the method in this embodiment may include the following steps.

Step 1001. The first UE sends an original association change request to a second MCPTT server, where the original association change request includes request information, and the request information is used to indicate that a first MCPTT user requests to change an association relationship between a second MCPTT user and a first MCPTT group.

The second MCPTT server is an MCPTT server in an MCPTT system that defines a user configuration file of the first MCPTT user.

It should be noted that step 1001 is similar to step 301, and details are no longer described herein.

Step 1002. The second MCPTT server determines whether the first MCPTT user is authorized to change an association relationship of the second MCPTT user.

If yes, step 1003 is performed; otherwise, the change procedure ends, or an original association change response used to indicate a change failure is sent to the first UE.

It should be noted that step 1002 is similar to step 303, and details are no longer described herein.

It should be noted that in this embodiment, the second MCPTT server may also perform the determining described in step 302.

Step 1003. The second MCPTT server sends a change message to second UE.

The change message is used to request the second MCPTT user to set the association relationship between the second MCPTT user and the first MCPTT group as the target association relationship.

Step 1004. The second UE sends a change response to the second MCPTT server.

The change response is used to indicate that setting of the association relationship between the second MCPTT user and the first MCPTT group as the target association relationship is authorized.

Step 1005. The second MCPTT server sends an association change request to a first MCPTT server according to the original association change request.

The first MCPTT server is an MCPTT server in an MCPTT system that defines the first MCPTT group.

The association change request includes request information, and the request information is used to indicate that the first MCPTT user requests to change the association relationship between the second MCPTT user and the first MCPTT group.

Step 1006. The first MCPTT server obtains a group policy of the first MCPTT group from a group management server.

It should be noted that step 1006 is similar to step 304, and details are no longer described herein.

Step 1007. The first MCPTT server determines, according to the group policy of the first MCPTT group, whether the first MCPTT group authorizes setting of the association relationship between the second MCPTT user and the first MCPTT group as a target association relationship.

If yes, step 1008 is performed; otherwise, the change procedure ends, or an original association change response used to indicate a change failure is sent to the first UE.

Step 1008. The first MCPTT server stores the target association relationship between the second MCPTT user and the first MCPTT group.

Step 1009. The first MCPTT server sends, to the second MCPTT server, an association change response used to indicate a change success.

Step 1010. The second MCPTT server sends an original association change response to the first UE according to the association change response.

It should be noted that after the second MCPTT server receives the association change response used to indicate a change success, the method may further include: storing the target association relationship between the second MCPTT user and the first MCPTT group.

It should be noted that a relationship between the original association change request and the association change request and a relationship between the original association change response and the association change response in this embodiment are the same as those in the embodiment shown in FIG. 5.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the second MCPTT user authorizes setting of the association relationship between the second MCPTT user and the first MCPTT group as a target association relationship, the second MCPTT server sends an association change request to a first MCPTT server; and the first MCPTT server determines whether the first MCPTT group authorizes setting of the association relationship between the second MCPTT user and the first MCPTT group as the target association relationship, and when the first MCPTT group authorizes the setting, the first MCPTT server stores the target association relationship between the second MCPTT user and the first MCPTT group. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 10 and the embodiment shown in FIG. 7 mainly have the following difference: In the embodiment shown in FIG. 10, the first UE sends an original association change request to the second MCPTT server, and after determining that the first MCPTT user is authorized to change an association relationship of the second MCPTT user, the second MCPTT server sends an association change request to the first MCPTT server; while in FIG. 7, the first UE directly sends an association change request to the first MCPTT server, and the first MCPTT server determines whether the first MCPTT user is authorized to change an association relationship of the second MCPTT server.

Figure 11:
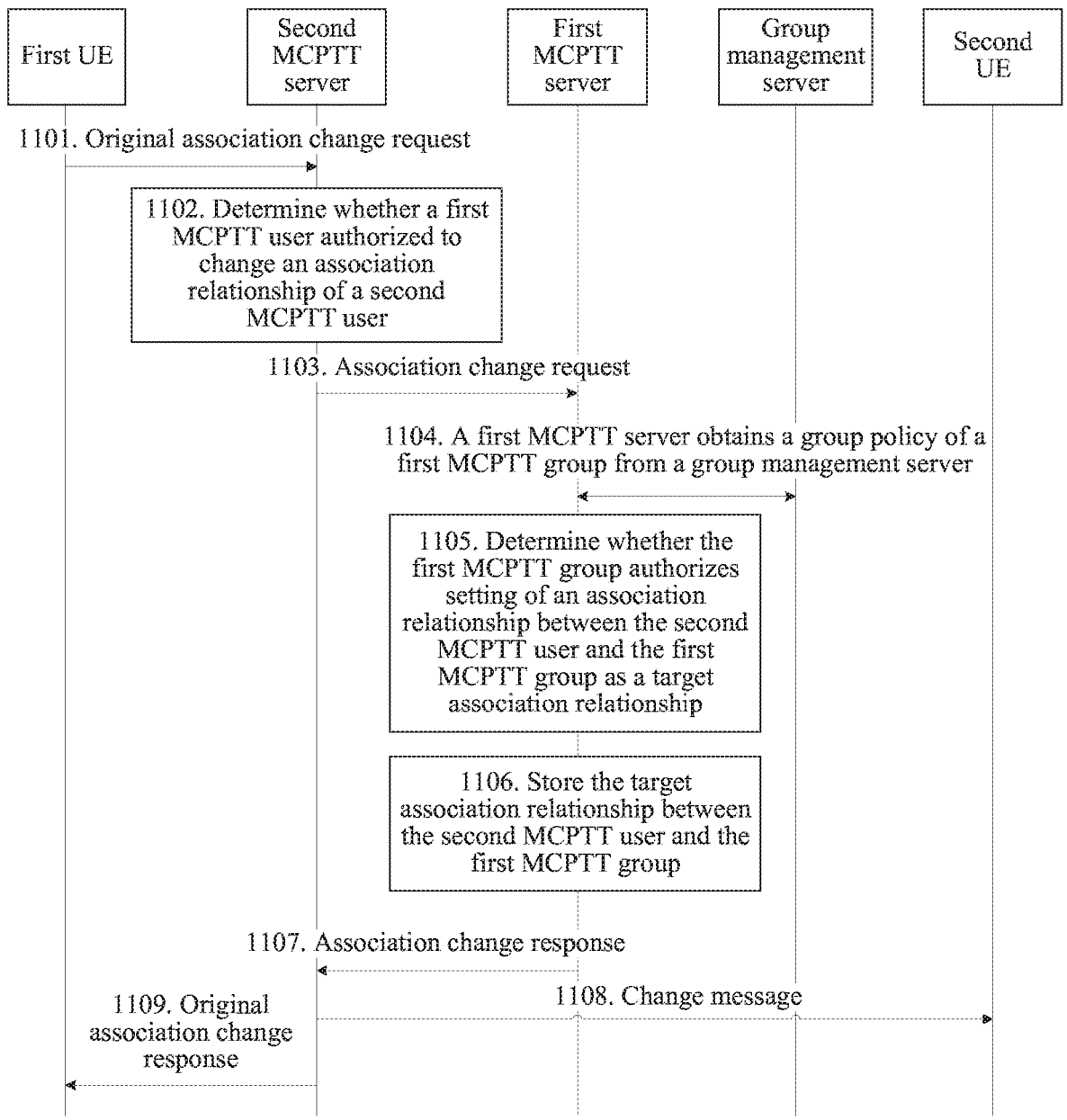
FIG. 11 is a flowchart of Embodiment 11 of a method for changing an association relationship between an MCPTT user and an MCPTT group according to the present disclosure.

FIG. 11 is a flowchart of Embodiment 11 of a method for changing an association relationship between an MCPTT user and an MCPTT group according to the present disclosure. An application scenario of this embodiment is the same as the application scenario of the embodiment shown in FIG. 8. As shown in FIG. 11, the method in this embodiment may include the following steps.

Step 1101. The first UE sends an original association change request to a second MCPTT server, where the original association change request includes request information, and the request information is used to indicate that a first MCPTT user requests to change an association relationship between a second MCPTT user and a first MCPTT group.

It should be noted that step 1101 is similar to step 301, and details are no longer described herein.

Step 1102. The second MCPTT server determines whether the first MCPTT user is authorized to change an association relationship of the second MCPTT user.

If yes, step 1103 is performed; otherwise, the change procedure ends, or an original association change response used to indicate a change failure is sent to the first UE.

It should be noted that step 1103 is similar to step 303, and details are no longer described herein.

It should be noted that in this embodiment, the second MCPTT server may also perform the determining described in step 302.

Step 1103. The second MCPTT server sends an association change request to a first MCPTT server according to the original association change request.

The first MCPTT server is an MCPTT server in an MCPTT system that defines the first MCPTT group.

The association change request includes request information, and the request information is used to indicate that the first MCPTT user requests to change the association relationship between the second MCPTT user and the first MCPTT group.

Step 1104. The first MCPTT server obtains a group policy of the first MCPTT group from a group management server.

It should be noted that step 1104 is similar to step 304, and details are no longer described herein.

Step 1105. The first MCPTT server determines, according to the group policy of the first MCPTT group, whether the first MCPTT group authorizes setting of the association relationship between the second MCPTT user and the first MCPTT group as a target association relationship.

If yes, step 1106 is performed; otherwise, the change procedure ends, or an original association change response used to indicate a change failure is sent to the first UE.

Step 1106. The first MCPTT server stores the target association relationship between the second MCPTT user and the first MCPTT group.

Step 1107. The first MCPTT server sends, to the second MCPTT server, an association change response used to indicate a change success.

Step 1108. The second MCPTT server sends a change message to second UE.

The change message is used to indicate that the association relationship between the second MCPTT user and the first MCPTT group is the target association relationship.

Optionally, the second MCPTT server may obtain the target association relationship in a manner of adding the target association relationship to an association change response message; or the second MCPTT server may obtain the target association relationship according to an association change request sent by the first UE.

Step 1109. The second MCPTT server sends an original association change response to the first UE according to the association change response.

It should be noted that after the second MCPTT server receives the association change response used to indicate a change success, the method may further include: storing the target association relationship between the second MCPTT user and the first MCPTT group.

It should be noted that a relationship between the original association change request and the association change request and a relationship between the original association change response and the association change response in this embodiment are the same as those in the embodiment shown in FIG. 5.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the first MCPTT user is authorized to change an association relationship of the second MCPTT user, the second MCPTT server sends an association change request to a first MCPTT server; and after the first MCPTT server determines that the first MCPTT group authorizes setting of the association relationship between the second MCPTT user and the first MCPTT group as a target association relationship, the second MCPTT server sends a change message (the change message is used to indicate that the association relationship between the second MCPTT user and the first MCPTT group is the target association relationship) to second UE. Therefore, the first MCPTT user can change an association relationship between the first MCPTT user and the first MCPTT group, thereby implementing that an MCPTT user changes an association relationship between another MCPTT user and a group.

Figure 12:
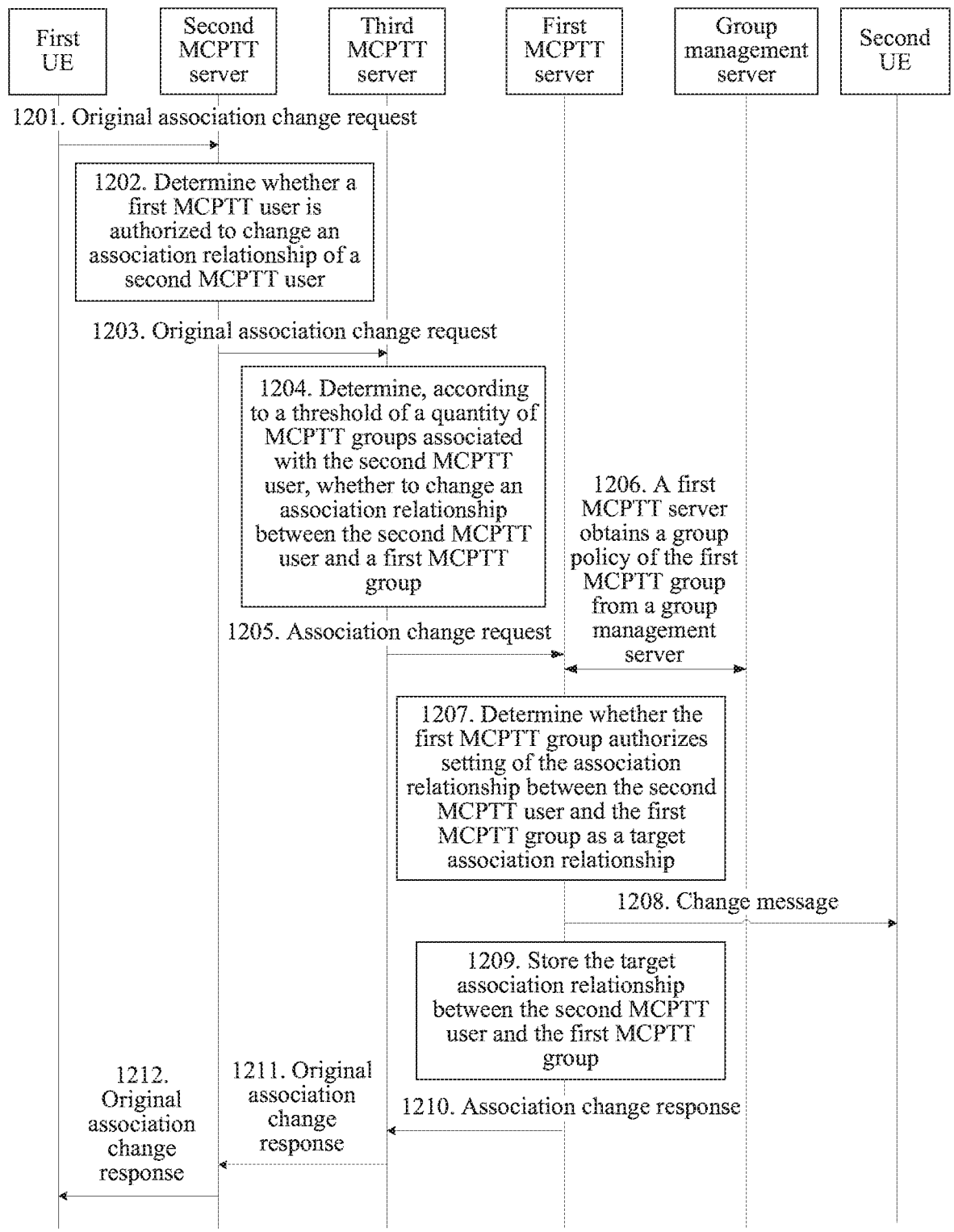
FIG. 12 is a flowchart of Embodiment 12 of a method for changing an association relationship between an MCPTT user and an MCPTT group according to the present disclosure.

FIG. 12 is a flowchart of Embodiment 12 of a method for changing an association relationship between an MCPTT user and an MCPTT group according to the present disclosure. An application scenario of this embodiment may be as follows: An MCPTT system that defines a user configuration file of a first MCPTT user, an MCPTT system that defines a user configuration file of a second MCPTT user, and an MCPTT system that defines a first MCPTT group are different. As shown in FIG. 12, the method in this embodiment may include the following steps.

Step 1201. The first UE sends an original association change request to a second MCPTT server, where the original association change request includes request information, and the request information is used to indicate that a first MCPTT user requests to change an association relationship between a second MCPTT user and a first MCPTT group.

The second MCPTT server is an MCPTT server in an MCPTT system that defines a user configuration file of the first MCPTT user.

It should be noted that step 1201 is similar to step 301, and details are no longer described herein.

Step 1202. The second MCPTT server determines whether the first MCPTT user is authorized to change an association relationship of the second MCPTT user.

If yes, step 1203 is performed; otherwise, the change procedure ends, or an original association change response used to indicate a change failure is sent to the first UE.

The second MCPTT server is an MCPTT server in the MCPTT system that defines the user configuration file of the first MCPTT user.

It should be noted that step 1202 is similar to step 803, and details are no longer described herein.

Step 1203. The second MCPTT server forwards the original association change request to a third MCPTT server.

The third MCPTT server is an MCPTT server in an MCPTT system that defines a user configuration file of the second MCPTT user.

Step 1204. The third MCPTT server determines, according to a threshold of a quantity of MCPTT groups associated with the second MCPTT user, whether to change the association relationship between the second MCPTT user and the first MCPTT group.

If yes, step 1205 is performed; otherwise, the change procedure ends, or an original association change response used to indicate a change failure is sent to the first UE.

By means of step 1204, the third MCPTT server can control the quantity of the MCPTT groups associated with the second MCPTT user.

Step 1205. The third MCPTT server sends an association change request to a first MCPTT server according to the original association change request.

The first MCPTT server is an MCPTT server in an MCPTT system that defines the first MCPTT group.

The association change request includes request information, and the request information is used to indicate that the first MCPTT user requests to change the association relationship between the second MCPTT user and the first MCPTT group.

Step 1206. The first MCPTT server obtains a group policy of the first MCPTT group from a group management server.

It should be noted that step 1206 is similar to step 304, and details are no longer described herein.

Step 1207. The first MCPTT server determines, according to the group policy of the first MCPTT group, whether the first MCPTT group authorizes setting of the association relationship between the second MCPTT user and the first MCPTT group as a target association relationship.

If yes, step 1208 is performed; otherwise, the change procedure ends, or an original association change response used to indicate a change failure is sent to the first UE.

It should be noted that step 1207 is similar to step 305, and details are no longer described herein.

Step 1208. The first MCPTT server sends a change message to second UE.

The second MCPTT user is a user using the second UE.

It should be noted that step 1208 is similar to step 306, and details are no longer described herein.

Step 1209. The first MCPTT server stores the target association relationship between the second MCPTT user and the first MCPTT group.

It should be noted that there is no sequential order between step 1209 and step 1208.

It should be noted that step 1209 is similar to step 307, and details are no longer described herein.

Step 1210. The first MCPTT server sends, to the third MCPTT server, an association change response used to indicate a change success.

Step 1211. The third MCPTT server forwards, to the second MCPTT server, the association change response used to indicate a change success.

Step 1212. The second MCPTT server sends an original association change response to the first UE according to the association change response.

It should be noted that a relationship between the original association change request and the association change request and a relationship between the original association change response and the association change response in this embodiment are the same as those in the embodiment shown in FIG. 5.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the first MCPTT user is authorized to change an association relationship of the second MCPTT user, the second MCPTT server sends the original association change request to a third MCPTT server; after determining, according to a threshold of a quantity of MCPTT groups associated with the second MCPTT user, to change the association relationship between the second MCPTT user and the first MCPTT group, the third MCPTT server sends an association change request to a first MCPTT server; and after determining that the first MCPTT group authorizes setting of the association relationship between the second MCPTT user and the first MCPTT group as a target association relationship, the first MCPTT server sends a change message (the change message is used to indicate that the association relationship between the second MCPTT user and the first MCPTT group is the target association relationship; or the change message is used to request the second MCPTT user to set the association relationship between the second MCPTT user and the first MCPTT group as the target association relationship) to second UE. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 12 and the embodiment shown in FIG. 8 mainly have the following difference: In the embodiment shown in FIG. 12, the first MCPTT server receives an association change request that is sent by the first UE by using the second MCPTT server; while in FIG. 8, the first MCPTT server receives an association change request that is sent by the first UE by using the second MCPTT server and the third MCPTT server.

It should be noted that the foregoing difference between the embodiment shown in FIG. 12 and the embodiment shown in FIG. 8 may further be applied to the embodiment shown in FIG. 8, to form a new technical solution.

Figure 13:
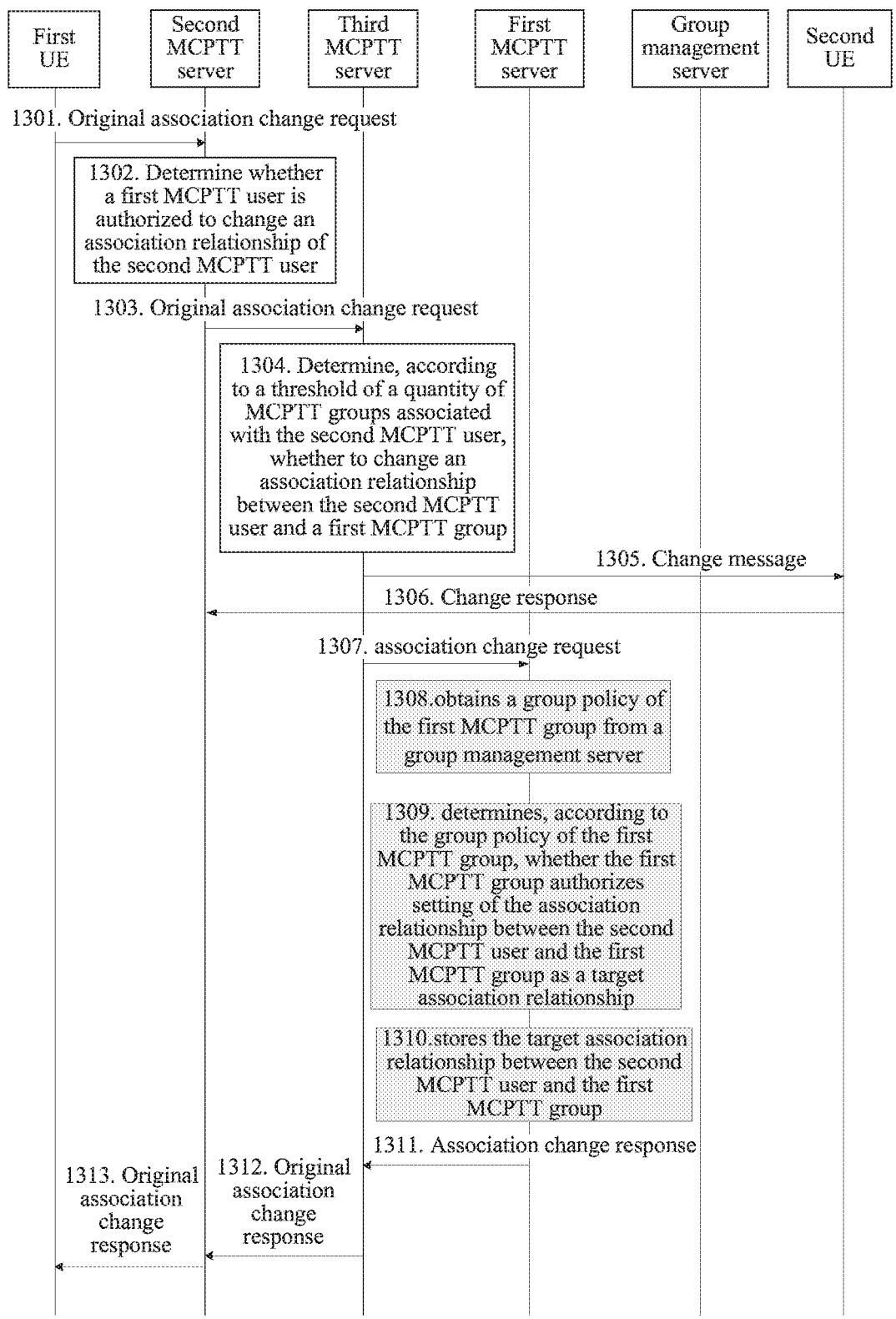
FIG. 13 is a flowchart of Embodiment 13 of a method for changing an association relationship between an MCPTT user and an MCPTT group according to the present disclosure.

FIG. 13 is a flowchart of Embodiment 13 of a method for changing an association relationship between an MCPTT user and an MCPTT group according to the present disclosure. An application scenario of this embodiment is the same as the application scenario of the embodiment shown in FIG. 12. As shown in FIG. 13, the method in this embodiment may include the following steps.

Step 1301. The first UE sends an original association change request to a second MCPTT server, where the original association change request includes request information, and the request information is used to indicate that a first MCPTT user requests to change an association relationship between a second MCPTT user and a first MCPTT group.

The second MCPTT server is an MCPTT server in an MCPTT system that defines a user configuration file of the first MCPTT user.

It should be noted that step 1301 is similar to step 301, and details are no longer described herein.

Step 1302. The second MCPTT server determines whether the first MCPTT user is authorized to change an association relationship of the second MCPTT user.

If yes, step 1303 is performed; otherwise, the change procedure ends, or an original association change response used to indicate a change failure is sent to the first UE.

The second MCPTT server is an MCPTT server in an MCPTT system that defines a user configuration file of the first MCPTT user.

It should be noted that step 1302 is similar to step 803, and details are no longer described herein.

Step 1303. The second MCPTT server forwards the original association change request to a third MCPTT server.

The third MCPTT server is an MCPTT server in an MCPTT system that defines a user configuration file of the second MCPTT user.

Step 1304. The third MCPTT server determines, according to a threshold of a quantity of MCPTT groups associated with the second MCPTT user, whether to change the association relationship between the second MCPTT user and the first MCPTT group.

If yes, step 1305 is performed; otherwise, the change procedure ends, or an original association change response used to indicate a change failure is sent to the first UE.

Step 1305. The third MCPTT server sends a change message to second UE.

The change message is used to request the second MCPTT user to set the association relationship between the second MCPTT user and the first MCPTT group as the target association relationship.

Step 1306. The second UE sends a change response to the second MCPTT server.

The change response is used to indicate that setting of the association relationship between the second MCPTT user and the first MCPTT group as the target association relationship is authorized.

Step 1307. The third MCPTT server sends an association change request to a first MCPTT server according to the original association change request.

The first MCPTT server is an MCPTT server in an MCPTT system that defines the first MCPTT group.

The association change request includes request information, and the request information is used to indicate that the first MCPTT user requests to change the association relationship between the second MCPTT user and the first MCPTT group.

Step 1308. The first MCPTT server obtains a group policy of the first MCPTT group from a group management server.

It should be noted that step 1308 is similar to step 304, and details are no longer described herein.

Step 1309. The first MCPTT server determines, according to the group policy of the first MCPTT group, whether the first MCPTT group authorizes setting of the association relationship between the second MCPTT user and the first MCPTT group as a target association relationship.

If yes, step 1310 is performed; otherwise, the change procedure ends, or an original association change response used to indicate a change failure is sent to the first UE.

It should be noted that step 1309 is similar to step 305, and details are no longer described herein.

Step 1310. The first MCPTT server stores the target association relationship between the second MCPTT user and the first MCPTT group.

It should be noted that step 1310 is similar to step 307, and details are no longer described herein.

Step 1311. The first MCPTT server sends, to the third MCPTT server, an association change response used to indicate a change success.

Step 1312. The third MCPTT server sends an original association change response to the second MCPTT server according to the association change response.

Step 1313. The second MCPTT server forwards the original association change response to the first UE.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the first MCPTT user is authorized to change an association relationship of the second MCPTT user, the second MCPTT server forwards the original association change request to a third MCPTT server; after determining that the second MCPTT user authorizes setting of the association relationship between the second MCPTT user and the first MCPTT group as a target association relationship, the third MCPTT server sends an association change request to a first MCPTT server; and the first MCPTT server determines whether the first MCPTT group authorizes setting of the association relationship between the second MCPTT user and the first MCPTT group as the target association relationship, and when the first MCPTT group authorizes the setting, the first MCPTT server stores the target association relationship between the second MCPTT user and the first MCPTT group. Therefore, the first MCPTT user can change an association relationship between the first MCPTT user and the first MCPTT group, thereby implementing that an MCPTT user changes an association relationship between another MCPTT user and a group.

It should be noted that the embodiment shown in FIG. 13 and the embodiment shown in FIG. 1 mainly have the following difference: In the embodiment shown in FIG. 13, the third MCPTT server sends a change message to the second UE, while in FIG. 10, the second MCPTT server sends a change message to the second UE.

Figure 14:
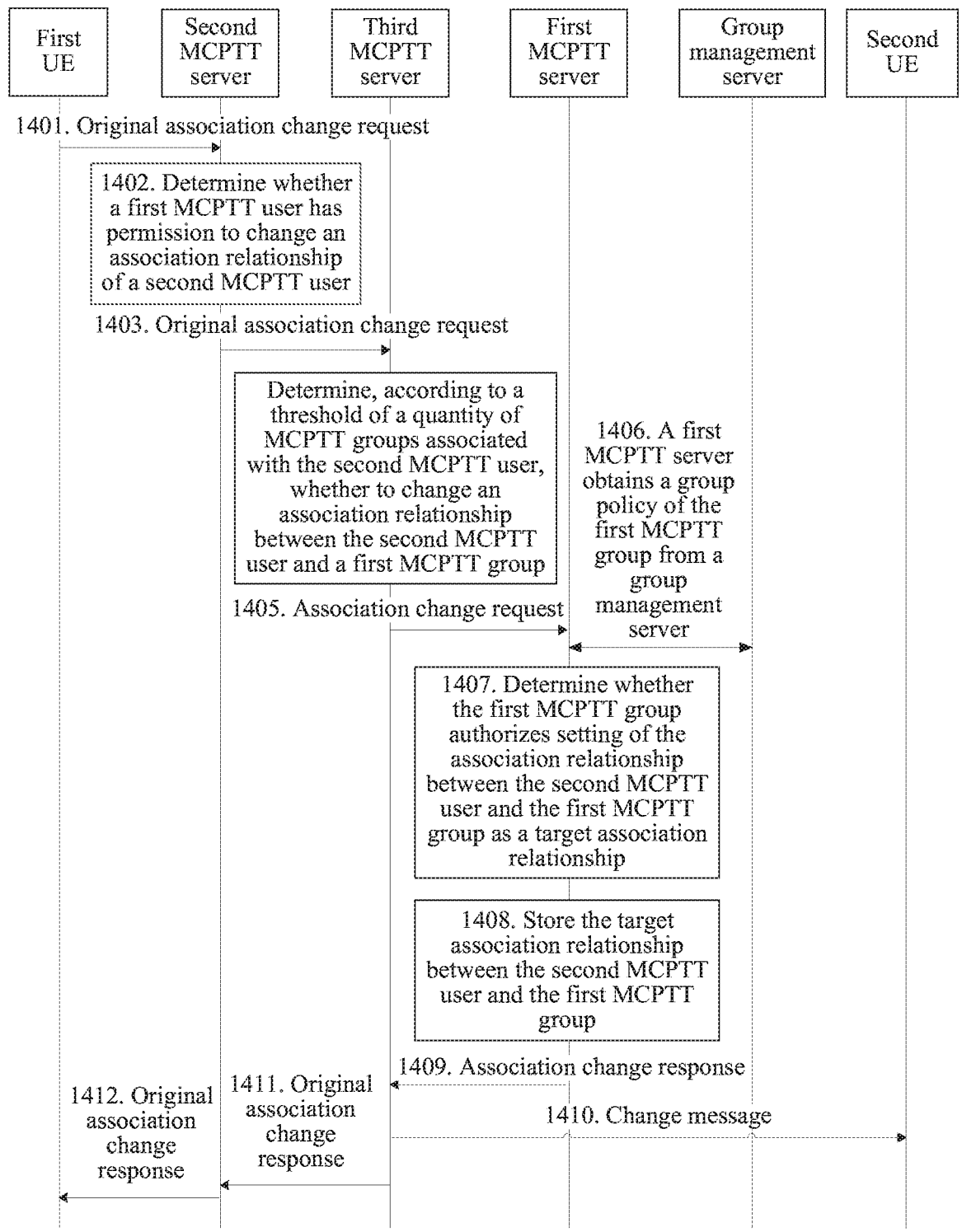
FIG. 14 is a flowchart of Embodiment 14 of a method for changing an association relationship between an MCPTT user and an MCPTT group according to the present disclosure.

FIG. 14 is a flowchart of Embodiment 14 of a method for changing an association relationship between an MCPTT user and an MCPTT group according to the present disclosure. An application scenario of this embodiment is the same as the application scenario of the embodiment shown in FIG. 12. As shown in FIG. 14, the method in this embodiment may include the following steps.

Step 1401. The first UE sends an original association change request to a second MCPTT server, where the original association change request includes request information, and the request information is used to indicate that a first MCPTT user requests to change an association relationship between a second MCPTT user and a first MCPTT group.

The second MCPTT server is an MCPTT server in an MCPTT system that defines a user configuration file of the first MCPTT user.

It should be noted that step 1401 is similar to step 301, and details are no longer described herein.

Step 1402. The second MCPTT server determines whether the first MCPTT user is authorized to change an association relationship of the second MCPTT user.

If yes, step 1403 is performed; otherwise, the change procedure ends, or an original association change response used to indicate a change failure is sent to the first UE.

The second MCPTT server is an MCPTT server in an MCPTT system that defines a user configuration file of the first MCPTT user.

It should be noted that step 1402 is similar to step 803, and details are no longer described herein.

Step 1403. The second MCPTT server forwards the original association change request to a third MCPTT server.

The third MCPTT server is an MCPTT server in an MCPTT system that defines a user configuration file of the second MCPTT user.

It should be noted that in the embodiments shown in FIG. 12 to FIG. 14, the second MCPTT server may directly forward, to the third MCPTT server, an original association change request sent by the first UE; or the second MCPTT server may send, after receiving an original association change request sent by the first UE, a new message to the first MCPTT server according to the original association change request.

Step 1404. The third MCPTT server determines, according to a threshold of a quantity of MCPTT groups associated with the second MCPTT user, whether to change the association relationship between the second MCPTT user and the first MCPTT group.

If yes, step 1405 is performed; otherwise, the change procedure ends, or an original association change response used to indicate a change failure is sent to the first UE.

Step 1405. The third MCPTT server sends an association change request to a first MCPTT server according to the original association change request.

The first MCPTT server is an MCPTT server in an MCPTT system that defines the first MCPTT group.

The association change request includes request information, and the request information is used to indicate that the first MCPTT user requests to change the association relationship between the second MCPTT user and the first MCPTT group.

Step 1406. The first MCPTT server obtains a group policy of the first MCPTT group from a group management server.

It should be noted that step 1406 is similar to step 304, and details are no longer described herein.

Step 1407. The first MCPTT server determines, according to the group policy of the first MCPTT group, whether the first MCPTT group authorizes setting of the association relationship between the second MCPTT user and the first MCPTT group as a target association relationship.

If yes, step 1408 is performed; otherwise, the change procedure ends, or an original association change response used to indicate a change failure is sent to the first UE.

It should be noted that step 1407 is similar to step 305, and details are no longer described herein.

Step 1408. The first MCPTT server stores the target association relationship between the second MCPTT user and the first MCPTT group.

It should be noted that step 1408 is similar to step 307, and details are no longer described herein.

Step 1409. The first MCPTT server sends, to the third MCPTT server, an association change response used to indicate a change success.

Step 1410. The third MCPTT server sends a change message to second UE.

The change message is used to indicate that the association relationship between the second MCPTT user and the first MCPTT group is the target association relationship.

Optionally, the third MCPTT server may obtain the target association relationship in a manner of adding the target association relationship to an association change response message; or the third MCPTT server may obtain the target association relationship according to an association change request sent by the first UE.

Step 1411. The third MCPTT server sends an original association change response to the second MCPTT server according to the association change response.

It should be noted that there is no sequential order between step 1411 and step 1410.

Step 1412. The second MCPTT server forwards the original association change response to the first UE.

It should be noted that a relationship between the original association change request and the association change request and a relationship between the original association change response and the association change response in this embodiment are the same as those in the embodiment shown in FIG. 5.

In this embodiment, the first UE sends an original association change request (the original association change request includes request information, and the request information is used to indicate that a first MCPTT user requests to change an association relationship between a second MCPTT user and a first MCPTT group) to a second MCPTT server; after determining that the first MCPTT user is authorized to change an association relationship of the second MCPTT user, the second MCPTT server forwards the original association change request to a third MCPTT server; after determining, according to a threshold of a quantity of MCPTT groups associated with the second MCPTT user, to change the association relationship between the second MCPTT user and the first MCPTT group, the third MCPTT server sends an association change response to a first MCPTT server; the first MCPTT server determines whether the first MCPTT group authorizes setting of the association relationship between the second MCPTT user and the first MCPTT group as a target association relationship; and after the first MCPTT server determines that the first MCPTT group authorizes the setting, the third MCPTT server sends a change message (the change message is used to indicate that the association relationship between the second MCPTT user and the first MCPTT group is the target association relationship) to second UE. Therefore, the first MCPTT user can change an association relationship between the first MCPTT user and the first MCPTT group, thereby implementing that an MCPTT user changes an association relationship between another MCPTT user and a group.

Figure 15:
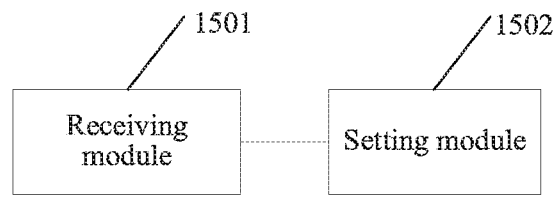
FIG. 15 is a schematic structural diagram of Embodiment 1 of an apparatus for changing an association relationship between an MCPTT user and an MCPTT group according to the present disclosure.

FIG. 15 is a schematic structural diagram of Embodiment 1 of an apparatus for changing an association relationship between an MCPTT user and an MCPTT group according to the present disclosure. The apparatus is a first network element device. As shown in FIG. 15, the apparatus includes: a receiving module 1501 and a setting module 1502. The receiving module 1501 is configured to receive an association change request sent by first user equipment UE. The association change request includes request information, the request information is used to indicate that a first MCPTT user requests to change an association relationship between a second MCPTT user and a first MCPTT group, and the first MCPTT user is an MCPTT user using the first UE. The setting module 1502 is configured to set the association relationship between the second MCPTT user and the first MCPTT group according to the association change request.

The apparatus in this embodiment may be configured to implement the technical solution in the method embodiment shown in FIG. 1. Implementation principles and technical effects thereof are similar, and details are no longer described herein.

Figure 16:
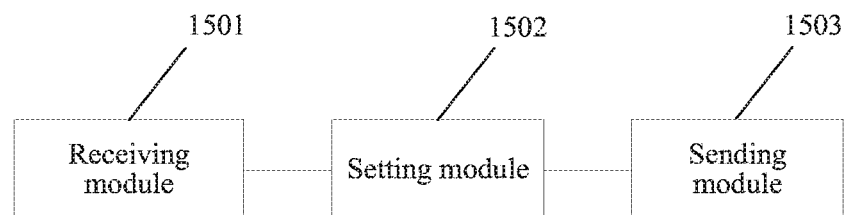
FIG. 16 is a schematic structural diagram of Embodiment 2 of an apparatus for changing an association relationship between an MCPTT user and an MCPTT group according to the present disclosure.

FIG. 16 is a schematic structural diagram of Embodiment 2 of an apparatus for changing an association relationship between an MCPTT user and an MCPTT group according to the present disclosure. As shown in FIG. 16, based on a structure of the apparatus shown in FIG. 15, the apparatus in this embodiment may further include a sending module 1503.

Optionally, the first network element device is a group management server of the first MCPTT group, or the first network element device is a first MCPTT server. The first MCPTT server is an MCPTT server in an MCPTT system that defines the first MCPTT group.

Optionally, the association change request further includes an association relationship indication, where the association relationship indication is used to indicate that the second MCPTT user is requested to be associated with or dissociated from the first MCPTT group.

Optionally, the request information includes:
a user identifier of the second MCPTT user and a group identifier of the first MCPTT group; or a group identifier of a second MCPTT group to which the second MCPTT user belongs and a group identifier of the first MCPTT group.

Optionally, the setting module 1502 is further configured to determine that the first MCPTT user is authorized to change an association relationship of the second MCPTT user.

Optionally, the setting module 1502 is further configured to determine, according to a threshold of a quantity of MCPTT groups associated with the second MCPTT user, to change the association relationship between the second MCPTT user and the first MCPTT group.

Optionally, the setting, by the setting module 1502, the association relationship between the second MCPTT user and the first MCPTT group according to the association change request specifically includes: setting the association relationship between the second MCPTT user and the first MCPTT group as a target association relationship according to the association change request, where the target association relationship is determined by the setting module according to the association change request.

Optionally, the setting module 1502 is further configured to determine, according to a group policy of the first MCPTT group, that the first MCPTT group authorizes setting of the association relationship between the second MCPTT user and the first MCPTT group as the target association relationship.

Optionally, the receiving module 1501 is specifically configured to: receive the association change request that is sent by the first UE by using a second network element device, where the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

Manner 1: The setting, by the setting module 1502, the association relationship between the second MCPTT user and the first MCPTT group as a target association relationship according to the association change request specifically includes: storing the target association relationship between the second MCPTT user and the first MCPTT group; and sending an association change response to the second network element device by using the sending module 1503, so that the second network element device forwards the association change response to the first UE, and sends a change message to second UE.

The change message is used to indicate that the association relationship between the second MCPTT user and the first MCPTT group is the target association relationship; and the second MCPTT user is an MCPTT user using the second UE.

Manner 2: The setting module 1502 is further configured to: send a change message to second UE by using the sending module 1503, where the change message is used to request the second MCPTT user to set the association relationship between the second MCPTT user and the first MCPTT group as the target association relationship, and the second MCPTT user is an MCPTT user using the second UE; and receive, by using the receiving module 1501, a change response sent by the second UE, where the change response is used to indicate that setting of the association relationship between the second MCPTT user and the first MCPTT group as the target association relationship is authorized.

Based on Manner 2, optionally, the setting, by the setting module 1502, the association relationship between the second MCPTT user and the first MCPTT group as a target association relationship according to the association change request specifically includes: storing the target association relationship between the second MCPTT user and the first MCPTT group.

Manner 3: Optionally, the setting, by the setting module 1502, the association relationship between the second MCPTT user and the first MCPTT group as a target association relationship according to the association change request specifically includes: sending a change message to second UE by using the sending module 1503, where the change message is used to indicate that the association relationship between the second MCPTT user and the first MCPTT group is the target association relationship, and the second MCPTT user is an MCPTT user using the second UE; and storing the target association relationship between the second MCPTT user and the first MCPTT group.

Optionally, the sending, by the sending module 1503, a change message to second UE specifically includes: sending the change message to the second UE by using an MCPTT server in the MCPTT system that defines the user configuration file of the second MCPTT user.

Based on Manner 2 and Manner 3, optionally, the sending module 1503 is further configured to send an association change response to the first UE.

Optionally, the change message includes a user identifier of the first MCPTT user.

Optionally, the association change request further includes the user identifier of the first MCPTT user.

The apparatus in this embodiment may be configured to implement the technical solutions on a side of the first MCPTT server or the group management server in the method embodiments shown in FIG. 3 to FIG. 14. Implementation principles and technical effects thereof are similar, and details are no longer described herein.

Figure 17:
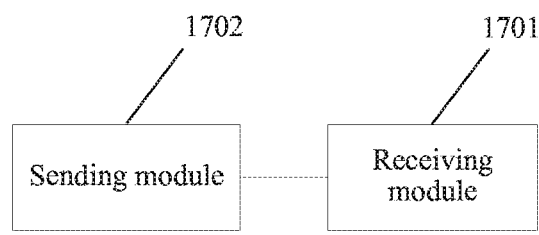
FIG. 17 is a schematic structural diagram of Embodiment 3 of an apparatus for changing an association relationship between an MCPTT user and an MCPTT group according to the present disclosure.

FIG. 17 is a schematic structural diagram of Embodiment 3 of an apparatus for changing an association relationship between an MCPTT user and an MCPTT group according to the present disclosure. The apparatus is a second network element device. As shown in FIG. 17, the apparatus includes: a receiving module 1701 and a sending module 1702. The receiving module 1701 is configured to receive an association change request sent by first user equipment UE. The association change request includes request information, the request information is used to indicate that a first MCPTT user requests to change an association relationship between a second MCPTT user and a first MCPTT group, and the first MCPTT user is an MCPTT user using the first UE. The sending module 1702 is configured to send a change message to second UE. The change message is used to request the second MCPTT user to set the association relationship between the second MCPTT user and the first MCPTT group as a target association relationship, and the second MCPTT user is an MCPTT user using the second UE. The receiving module 1701 is further configured to receive a change response sent by the second UE. The change response is used to indicate that setting of the association relationship between the second MCPTT user and the first MCPTT group as the target association relationship is authorized. The sending module 1702 is further configured to send the association change request to a first network element device.

Optionally, the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

Optionally, the first network element device is a group management server of the first MCPTT group, or the first network element device is a first MCPTT server. The first MCPTT server is an MCPTT server in an MCPTT system that defines the first MCPTT group.

The apparatus in this embodiment may be configured to implement the technical solution of the second MCPTT server in the method embodiment shown in FIG. 10 and the technical solution on a side of the third MCPTT server in the method embodiment shown in FIG. 13. Implementation principles and technical effects thereof are similar, and details are no longer described herein.

Embodiment 4 of an apparatus for changing an association relationship between an MCPTT user and an MCPTT group The apparatus in this embodiment is a first UE. A structure in this embodiment is similar to a structure of the apparatus shown in FIG. 17, and may also include a sending module and a receiving module. The sending module is configured to send an association change request to a first network element device. The association change request includes request information. The request information is used to indicate that a first MCPTT user requests to change an association relationship between a second MCPTT user and a first MCPTT group, so that the first network element device sets the association relationship between the second MCPTT user and the first MCPTT group according to the association change request. The first MCPTT user is a user using the first UE. The receiving module is configured to receive an association change response sent by the first network element device.

Optionally, the first network element device is a group management server of the first MCPTT group, or the first network element device is an MCPTT server in an MCPTT system that defines the first MCPTT group.

Optionally, the association change request further includes an association relationship indication, where the association relationship indication is used to indicate that the second MCPTT user is requested to be associated with or dissociated from the first MCPTT group.

Optionally, the request information includes: a user identifier of the second MCPTT user and a group identifier of the first MCPTT group; or a group identifier of a second MCPTT group to which the second MCPTT user belongs and a group identifier of the first MCPTT group.

Optionally, the association change request includes a user identifier of the first MCPTT user.

The apparatus in this embodiment may be configured to implement the technical solutions on a side of first UE in the method embodiments shown in FIG. 3 to FIG. 14. Implementation principles and technical effects thereof are similar, and details are no longer described herein.

The present disclosure further provides a system for changing an association relationship between a mission critical push to talk MCPTT user and an MCPTT group, including: the first network element device according to Embodiment 1 or Embodiment 2 of the apparatus for changing an association relationship between an MCPTT user and an MCPTT group, and the first UE according to Embodiment 4 of the apparatus for changing an association relationship between an MCPTT user and an MCPTT group.

Optionally, the system in this embodiment may further include: the second network element device according to Embodiment 3 of the apparatus for changing an association relationship between an MCPTT user and an MCPTT group.

The system in this embodiment may be used to implement the technical solutions in the method embodiments shown in FIG. 3 to FIG. 13. Implementation principles and technical effects thereof are similar, and details are no longer described herein.

Figure 18:
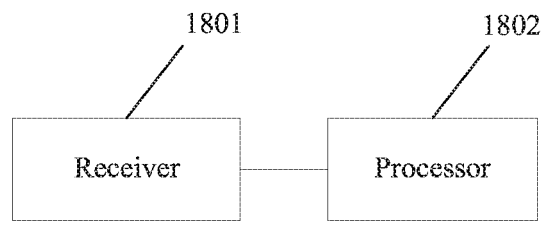
FIG. 18 is a schematic structural diagram of Embodiment 5 of an apparatus for changing an association relationship between an MCPTT user and an MCPTT group according to the present disclosure.

FIG. 18 is a schematic structural diagram of Embodiment 5 of an apparatus for changing an association relationship between an MCPTT user and an MCPTT group according to the present disclosure. The apparatus is a first network element device. As shown in FIG. 18, the apparatus includes: a receiver 1801 and a processor 1802. The receiver 1801 is configured to receive an association change request sent by first user equipment UE. The association change request includes request information, the request information is used to indicate that a first MCPTT user requests to change an association relationship between a second MCPTT user and a first MCPTT group, and the first MCPTT user is an MCPTT user using the first UE. The processor 1802 is configured to set the association relationship between the second MCPTT user and the first MCPTT group according to the association change request.

The apparatus in this embodiment may be configured to implement the technical solution in the method embodiment shown in FIG. 1. Implementation principles and technical effects thereof are similar, and details are no longer described herein.

Figure 19:
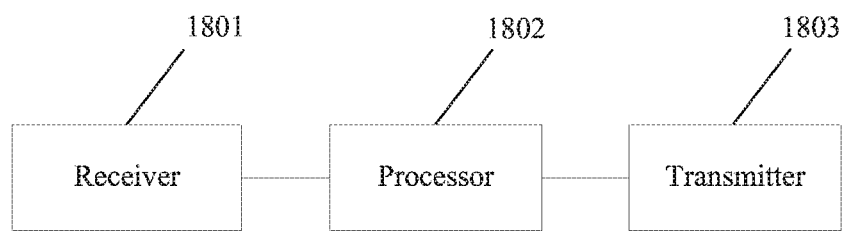
FIG. 19 is a schematic structural diagram of Embodiment 6 of an apparatus for changing an association relationship between an MCPTT user and an MCPTT group according to the present disclosure.

FIG. 19 is a schematic structural diagram of Embodiment 6 of an apparatus for changing an association relationship between an MCPTT user and an MCPTT group according to the present disclosure. As shown in FIG. 19, based on a structure of the apparatus shown in FIG. 18, the apparatus in this embodiment may further include a transmitter 1803.

Optionally, the first network element device is a group management server of the first MCPTT group, or the first network element device is a first MCPTT server. The first MCPTT server is an MCPTT server in an MCPTT system that defines the first MCPTT group.

Optionally, the association change request further includes an association relationship indication, where the association relationship indication is used to indicate that the second MCPTT user is requested to be associated with or dissociated from the first MCPTT group.

Optionally, the request information includes: a user identifier of the second MCPTT user and a group identifier of the first MCPTT group; or a group identifier of a second MCPTT group to which the second MCPTT user belongs and a group identifier of the first MCPTT group.

Optionally, the processor 1802 is further configured to determine that the first MCPTT user is authorized to change an association relationship of the second MCPTT user.

Optionally, the processor 1802 is further configured to determine, according to a threshold of a quantity of MCPTT groups associated with the second MCPTT user, to change the association relationship between the second MCPTT user and the first MCPTT group.

Optionally, the setting, by the processor 1802, the association relationship between the second MCPTT user and the first MCPTT group according to the association change request specifically includes: setting the association relationship between the second MCPTT user and the first MCPTT group as a target association relationship according to the association change request, where the target association relationship is determined by the setting module according to the association change request.

Optionally, the processor 1802 is further configured to determine, according to a group policy of the first MCPTT group, that the first MCPTT group authorizes setting of the association relationship between the second MCPTT user and the first MCPTT group as the target association relationship.

Optionally, the receiver 1801 is specifically configured to: receive the association change request that is sent by the first UE by using a second network element device, where the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

Manner 1: The setting, by the processor 1802, the association relationship between the second MCPTT user and the first MCPTT group as a target association relationship according to the association change request specifically includes: storing the target association relationship between the second MCPTT user and the first MCPTT group; and sending an association change response to the second network element device by using the transmitter 1803, so that the second network element device forwards the association change response to the first UE, and sends a change message to second UE.

The change message is used to indicate that the association relationship between the second MCPTT user and the first MCPTT group is the target association relationship; and the second MCPTT user is an MCPTT user using the second UE.

Manner 2: The processor 1802 is further configured to: send a change message to second UE by using the transmitter 1803, where the change message is used to request the second MCPTT user to set the association relationship between the second MCPTT user and the first MCPTT group as the target association relationship, and the second MCPTT user is an MCPTT user using the second UE; and receive, by using the receiver 1801, a change response sent by the second UE, where the change response is used to indicate that setting of the association relationship between the second MCPTT user and the first MCPTT group as the target association relationship is authorized.

Based on Manner 2, optionally, the setting, by the processor 1802, the association relationship between the second MCPTT user and the first MCPTT group as a target association relationship according to the association change request specifically includes: storing the target association relationship between the second MCPTT user and the first MCPTT group.

Manner 3: Optionally, the setting, by the processor 1802, the association relationship between the second MCPTT user and the first MCPTT group as a target association relationship according to the association change request specifically includes: sending a change message to second UE by using the transmitter 1803, where the change message is used to indicate that the association relationship between the second MCPTT user and the first MCPTT group is the target association relationship, and the second MCPTT user is an MCPTT user using the second UE; and storing the target association relationship between the second MCPTT user and the first MCPTT group.

Optionally, the sending, by the transmitter 1803, a change message to second UE specifically includes: sending the change message to the second UE by using an MCPTT server in the MCPTT system that defines the user configuration file of the second MCPTT user.

Based on Manner 2 and Manner 3, optionally, the transmitter 1803 is further configured to send an association change response to the first UE.

The apparatus in this embodiment may be configured to implement the technical solutions on a side of the first MCPTT server or the group management server in the method embodiments shown in FIG. 3 to FIG. 14. Implementation principles and technical effects thereof are similar, and details are no longer described herein.

Embodiment 7 of an apparatus for changing an association relationship between an MCPTT user and an MCPTT group.

The apparatus in this embodiment is a second network element device. A structure in this embodiment is similar to a structure of the apparatus shown in FIG. 19, and may also include a receiver, a processor, and a transmitter. The processor is configured to receive, by using a receiver, an association change request sent by first user equipment UE. The association change request includes request information, the request information is used to indicate that a first MCPTT user requests to change an association relationship between a second MCPTT user and a first MCPTT group, and the first MCPTT user is an MCPTT user using the first UE. The processor is further configured to send a change message to second UE by using the transmitter. The change message is used to request the second MCPTT user to set the association relationship between the second MCPTT user and the first MCPTT group as a target association relationship, and the second MCPTT user is an MCPTT user using the second UE. The processor is further configured to receive, by using the receiver, a change response sent by the second UE. The change response is used to indicate that setting of the association relationship between the second MCPTT user and the first MCPTT group as the target association relationship is authorized. The processor is further configured to send the association change request to a first network element device by using the transmitter.

Optionally, the second network element device is a second MCPTT server or a third MCPTT server; the second MCPTT server is an MCPTT server in an MCPTT system that defines a user configuration file of the first MCPTT user; and the third MCPTT server is an MCPTT server in an MCPTT system that defines a user configuration file of the second MCPTT user.

Optionally, the first network element device is a group management server of the first MCPTT group, or the first network element device is a first MCPTT server. The first MCPTT server is an MCPTT server in an MCPTT system that defines the first MCPTT group.

The apparatus in this embodiment may be configured to implement the technical solution of the second MCPTT server in the method embodiment shown in FIG. 10 and the technical solution on a side of the third MCPTT server in the method embodiment shown in FIG. 13. Implementation principles and technical effects thereof are similar, and details are no longer described herein.

Embodiment 8 of an apparatus for changing an association relationship between an MCPTT user and an MCPTT group.

The apparatus in this embodiment is a first UE. A structure in this embodiment is similar to a structure of the apparatus shown in FIG. 19, and may also include a receiver, a processor, and a transmitter. The processor is configured to send an association change request to a first network element device by using the transmitter. The association change request includes request information. The request information is used to indicate that a first MCPTT user requests to change an association relationship between a second MCPTT user and a first MCPTT group, so that the first network element device sets the association relationship between the second MCPTT user and the first MCPTT group according to the association change request. The first MCPTT user is a user using the first UE. The processor is further configured to receive, by using the receiver, an association change response sent by the first network element device.

Optionally, the first network element device is a group management server of the first MCPTT group, or the first network element device is an MCPTT server in an MCPTT system that defines the first MCPTT group.

Optionally, the association change request further includes an association relationship indication, where the association relationship indication is used to indicate that the second MCPTT user is requested to be associated with or dissociated from the first MCPTT group.

Optionally, the request information includes: a user identifier of the second MCPTT user and a group identifier of the first MCPTT group; or a group identifier of a second MCPTT group to which the second MCPTT user belongs and a group identifier of the first MCPTT group.

The apparatus in this embodiment may be configured to implement the technical solutions on a side of first UE in the method embodiments shown in FIG. 3 to FIG. 14. Implementation principles and technical effects thereof are similar, and details are no longer described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:
1. A method, comprising:
receiving, by a second mission critical push to talk (MCPTT) server, an original association change request from a first user equipment (UE), wherein the original association change request comprises request information indicating that a first MCPTT user requests to change an association relationship between a second MCPTT user and a first MCPTT group, and the first MCPTT user is an MCPTT user using the first UE;

determining, by the second MCPTT server, that the first MCPTT user is authorized to change the association relationship between the second MCPTT user and the first MCPTT group;
sending, by the second MCPTT server according to the original association change request, an association change request to a first MCPTT server;
receiving, by the second MCPTT server, an association change response from the first MCPTT server, the association change response indicating the first MCPTT server has changed the association relationship between the second MCPTT user and the first MCPTT group;
sending, by the second MCPTT server, a change message to a second UE, the change message indicating that the association relationship between the second MCPTT user and the first MCPTT group is a target association relationship, and wherein the second MCPTT user is an MCPTT user using the second UE; and
sending, by the second MCPTT server, an original association change response to the first UE.

2. The method according to claim 1, wherein after receiving the association change response from the first MCPTT server, the method further comprises:
storing, by the second MCPTT server, the target association relationship between the second MCPTT user and the first MCPTT group.

3. The method according to claim 1, further comprising:
receiving, by the first MCPTT server, the association change request from the second MCPTT server; and
sending, by the first MCPTT server, the association change response to the second MCPTT server.

4. The method according to claim 3, further comprising:
obtaining, by the first MCPTT server, a group policy of the first MCPTT group from a group management server; and
determining, by the first MCPTT server according to the group policy of the first MCPTT group, that the first MCPTT group authorizes setting of the association relationship between the second MCPTT user and the first MCPTT group as the target association relationship.

5. The method according to claim 4, further comprising:
storing, by the first MCPTT server, the target association relationship between the second MCPTT user and the first MCPTT group.

6. The method according to claim 1, wherein the first MCPTT server is an MCPTT server in an MCPTT system that defines the first MCPTT group.

7. The method according to claim 1, further comprising:
obtaining, by the second MCPTT server, the target association relationship according to the original association change request.

8. A method, comprising:
receiving, by a first a mission critical push to talk (MCPTT) server, an association change request from a second MCPTT server, wherein the association change request comprises request information indicating that a first MCPTT user requests to change an association relationship between a second MCPTT user and a first MCPTT group;
obtaining, by the first MCPTT server, a group policy of the first MCPTT group from a group management server;
determining, by the first MCPTT server according to the group policy of the first MCPTT group, that the first MCPTT group authorizes setting of the association relationship between the second MCPTT user and the first MCPTT group as a target association relationship;
storing, by the first MCPTT server, the target association relationship between the second MCPTT user and the first MCPTT group; and
sending, by the first MCPTT server, an association change response to the second MCPTT server, the association change response indicating the first MCPTT server has changed the association relationship between the second MCPTT user and the first MCPTT group.

9. The method according to claim 8, further comprising:
sending, by the second MCPTT server, the association change request to the first MCPTT server; and
receiving, by the second MCPTT server, the association change response from the first MCPTT server.

10. The method according to claim 9, further comprising:
receiving, by the second MCPTT server, an original association change request from a first user equipment (UE), wherein the original association change request comprises the request information, and the first MCPTT user is an MCPTT user using the first UE; and
determining, by the second MCPTT server, that the first MCPTT user is authorized to change the association relationship between the second MCPTT user and the first MCPTT group.

11. The method according to claim 10, further comprising:
sending, by the second MCPTT server, a change message to a second UE, the change message indicating that the association relationship between the second MCPTT user and the first MCPTT group is a target association relationship, and wherein the second MCPTT user is an MCPTT user using the second UE; and
sending, by the second MCPTT server, an original association change response to the first UE.

12. The method according to claim 11, wherein after receiving the original association change response from the first MCPTT server, the method further comprises:
storing, by the second MCPTT server, the target association relationship between the second MCPTT user and the first MCPTT group.

13. An apparatus, comprising:
a transmitter;
a receiver, configured to receive an original association change request from a first user equipment (UE), wherein the original association change request comprises request information indicating that a first MCPTT user requests to change an association relationship between a second MCPTT user and a first MCI-TI' group, and the first MCPTT user is an MCPTT user using the first UE;
a processor, configured to:
determine that the first MCPTT user is authorized to change the association relationship between the second MCPTT user and the first MCPTT group; and
send, according to the original association change request, an association change request to a first MCPTT server;
wherein the receiver is further configured to receive an association change response from the first MCPTT server, the association change response indicating the first MCPTT server has changed the association relationship between the second MCPTT user and the first MCPTT group; and
wherein the transmitter is configured to:
send a change message to a second UE, the change message indicating that the association relationship between the second MC VII user and the first MCPTT group is a target association relationship, and wherein the second MCPTT user is an MCPTT user using the second UE; and send an original association change response to the first UE.

14. The apparatus according to claim 13, further comprising:

a memory, configured to store the target association relationship between the second MCPTT user and the first MCPTT group.

15. The apparatus according to claim 13, wherein the first MCPTT server is an MCPTT server in an MCPTT system that defines the first MCPTT group.

16. An system, comprising:

a first mission critical push to talk (MCPTT) server; and
a second MCPTT server, configured to:
  receive an original association change request from a first user equipment (UE), wherein the original association change request comprises request information indicating that a first MCPTT user requests to change an association relationship between a second MCPTT user and a first MCPTT group, and the first MCPTT user is an MCPTT user using the first UE;
  determine that the first MCPTT user is authorized to change the association relationship between the second MCPTT user and the first MCPTT group;
  send, according to the original association change request, an association change request to the first MCPTT server;
  receive an association change response from the first MCPTT server, the association change response indicating the first MCPTT server has changed the association relationship between the second MCPTT user and the first MCPTT group;
  send a change message to a second UE, the change message indicating that the association relationship between the second MCPTT user and the first MCPTT group is a target association relationship, and wherein the second MCPTT user is an MCPTT user using the second UE; and
  send an original association change response to the first UE; and wherein the first MCPTT server is configured to:
  receive the association change request from the second MCPTT server; and
  send the association change response to the second MCPTT server.

17. The system according to claim 16, wherein the second MCPTT server is further configured to:

store the target association relationship between the second MCPTT user and the first MCPTT group.

18. The system according to claim 16, wherein the first MCPTT server is further configured to:

obtain a group policy of the first MCPTT group from a group management server; and
determine, according to the group policy of the first MCPTT group, that the first MCPTT group authorizes setting of the association relationship between the second MCPTT user and the first MCPTT group as a target association relationship.

19. The system according to claim 18, wherein the first MCPTT server is further configured to:

store the target association relationship between the second MCPTT user and the first MCPTT group.

20. The system according to claim 16, wherein the second MCPTT server is further configured to:

obtain the target association relationship according to the original association change request.

\* \* \* \* \*

UNITED STATES PATENT AND TRADEMARK OFFICE
CERTIFICATE OF CORRECTION

PATENT NO. : 11,617,063 B2
APPLICATION NO. : 17/082696
DATED : March 28, 2023
INVENTOR(S) : Yizhuang Wu et al.

It is certified that error appears in the above-identified patent and that said Letters Patent is hereby corrected as shown below:

In the Claims

Claim 13, Column 46, Line 50; delete "MCI-TI'" and insert --MCPTT--.

Claim 13, Column 47, Line 1; delete "MC VII" and insert --MCPTT--.

Signed and Sealed this
Twenty-fifth Day of April, 2023

Katherine Kelly Vidal
*Director of the United States Patent and Trademark Office*